(12) United States Patent
Churei

(10) Patent No.: US 8,547,468 B2
(45) Date of Patent: Oct. 1, 2013

(54) IMAGE PICKUP APPARATUS THAT SHOOTS SUBJECT VIEWED THROUGH VIEWFINDER, CONTROL METHOD THEREFOR, AND STORAGE MEDIUM

(75) Inventor: Kiyokazu Churei, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 202 days.

(21) Appl. No.: 13/079,536

(22) Filed: Apr. 4, 2011

(65) Prior Publication Data

US 2011/0249165 A1 Oct. 13, 2011

(30) Foreign Application Priority Data

Apr. 8, 2010 (JP) ................................ 2010-089409
Mar. 31, 2011 (JP) ................................ 2011-080212

(51) Int. Cl.
*H04N 5/222* (2006.01)

(52) U.S. Cl.
USPC ................................ 348/333.06; 348/333.02

(58) Field of Classification Search
USPC ................. 348/207.99, 222.1, 231.3, 333.01, 348/333.02, 333.04, 333.12, 341, 333.06; 715/702, 747, 835; 396/281–296
See application file for complete search history.

(56) References Cited

U.S. PATENT DOCUMENTS

| | | | |
|---|---|---|---|
| 2004/0046887 A1* | 3/2004 | Ikehata et al. | 348/333.12 |
| 2004/0252205 A1* | 12/2004 | Onoda | 348/231.3 |
| 2006/0072028 A1* | 4/2006 | Hong | 348/333.01 |
| 2009/0040332 A1* | 2/2009 | Yoshino et al. | 348/222.1 |
| 2009/0187861 A1* | 7/2009 | Hitosuga | 715/835 |
| 2009/0228792 A1* | 9/2009 | van Os et al. | 715/702 |
| 2009/0262211 A1* | 10/2009 | Mori | 348/222.1 |
| 2010/0058196 A1* | 3/2010 | Krishnan et al. | 715/747 |
| 2010/0134676 A1* | 6/2010 | Miyanishi | 348/333.01 |

FOREIGN PATENT DOCUMENTS

| | | | |
|---|---|---|---|
| CN | 1901625 A | | 1/2007 |
| CN | 1997110 A | | 7/2007 |
| JP | 08122852 A | * | 5/1996 |
| JP | 2001-059984 | | 3/2001 |
| JP | 2004-0165934 | | 6/2004 |
| JP | 2009-260681 A | | 11/2009 |
| JP | 2010136163 A | * | 6/2010 |
| KR | 10-2007-0082532 A | | 8/2007 |

OTHER PUBLICATIONS

The above references were cited in a Dec. 24, 2012 Chinese Office Action, enclosed with English Translation, that issued in Chinese Patent Application No. 201110091236.7.

* cited by examiner

*Primary Examiner* — Nelson D. Hernández Hernández
*Assistant Examiner* — Dennis Hogue
(74) *Attorney, Agent, or Firm* — Cowan, Liebowitz & Latman, P.C.

(57) ABSTRACT

An image pickup apparatus that reduces the likelihood that when a user operates a display screen with a fingertip while not looking through a viewfinder, the user's fingertip will be falsely detected, and makes it less likely that erroneous operation resulting from the false detection will occur. When an eye proximity sensor detects an object approaching, the light emission luminance of a display unit is reduced, or display on the display unit is turned off. When the eye proximity sensor has not detected an object approaching, first-type display objects that execute assigned functions in response to touch operations are displayed farther away from the eye proximity sensor on a display surface of the display unit than second-type display objects that do not execute assigned functions even when touched. When a touch on any of the first-type display objects is detected, a function assigned to the first-type display object is executed.

20 Claims, 14 Drawing Sheets

IMAGE PICKUP APPARATUS THAT SHOOTS SUBJECT VIEWED THROUGH VIEWFINDER, CONTROL METHOD THEREFOR, AND STORAGE MEDIUM

BACKGROUND OF THE INVENTION

1. Field of the Invention

The present invention relates to an image pickup apparatus that shoots a subject viewed through a viewfinder, a control method therefor, and a computer-readable storage medium storing a program for causing a computer to implement the method.

2. Description of the Related Art

In recent years, a number of cameras which have an information display unit, typified by a TFT liquid crystal display, mounted on a back side of the camera so as to display states of the camera. Among such cameras, there are those equipped with an eye proximity sensor for automatically turning off display on the information display unit because a display surface of the information display unit is dazzling when a user looks through a viewfinder. This eye proximity sensor merely detects whether or not an object has approached, and in general, an infrared sensor is used as the eye proximity sensor.

On the other hand, cameras in which a touch panel for detecting user's operations is mounted on the display surface of the information display unit have come on the market. In general, the viewfinder, the eye proximity sensor, and the information display unit are provided on the back side of the camera. Thus, in cameras of which eye proximity sensor and touch panel are operated in combination, there may be a case where erroneous operation occurs due to the tip of a user's nose touching the touch panel when the user looks through the viewfinder.

To address this, it is described in Japanese Laid-Open Patent Publication (Kokai) No. 2001-059984 that in a camera, the touch panel is prohibited from being operated according to detection outputs from the eye proximity sensor, thus preventing erroneous operation. Also, it is described in Japanese Laid-Open Patent Publication (Kokai) No. 2004-165934 that in an image pickup apparatus, an operation on the touch panel is switched to an operation different from that in normal cases so as to be isolated from contents displayed on the information display unit so that erroneous operation can be prevented.

However, the conventional image pickup apparatuses described above present problems explained hereafter. The techniques described in Japanese Laid-Open Patent Publication (Kokai) No. 2001-059984 and Japanese Laid-Open Patent Publication (Kokai) No. 2004-165934 relate to the prevention of erroneous operation in the touch panel when the user looks through the viewfinder, but do not contribute at all to preventing malfunction of the camera resulting from false detection by the eye proximity sensor.

Specifically, according to Japanese Laid-Open Patent Publication (Kokai) No. 2001-059984, when the user operates the touch panel with a fingertip while not looking through the viewfinder, if the eye proximity sensor determines the user's fingertip as the face, the information display unit turns off despite the user's intent.

Also, according to Japanese Laid-Open Patent Publication (Kokai) No. 2004-165934, when the user operates the touch panel with a fingertip while not looking through the viewfinder, if the eye proximity sensor determines the user's fingertip as the face, contents displayed on the information display unit change despite the user's intent. This makes it impossible to perform desired operations.

A description will now be given of this problem with reference to FIG. 7. FIG. 7 is a view showing an appearance of a back side of a conventional digital single-lens reflex camera. When the user tries to change shooting conditions by touching an area where an aperture value "F8.0" is displayed on a TFT liquid crystal display 732 having a touch panel in the digital single-lens reflex camera 731, a problem explained hereafter may arise. The area where the aperture value "F8.0" is displayed is close to an eye proximity sensor 734, and hence the eye proximity sensor 734 may falsely detect the user's fingertip as a user's eye looking through a viewfinder 738. Due to this false detection, the camera 731 determines that the user is going to perform shooting, and turns off display on the TFT liquid crystal display 732. Namely, when the user is trying to touch the area where the aperture value "F8.0" is displayed, an erroneous operation occurs in which display is turned off, making it impossible to change shooting conditions.

SUMMARY OF THE INVENTION

The present invention provides an image pickup apparatus that reduces the likelihood that when a user operates a display screen with a fingertip while not looking through a viewfinder, the user's fingertip will be falsely detected, and makes it less likely that erroneous operation resulting from the false detection will occur, a control method for the image pickup apparatus, and a computer-readable storage medium storing a program for causing a computer to implement the method.

Accordingly, a first aspect of the present invention provides an image pickup apparatus comprising a finder having an eyepiece, an approach detection unit configured to detect an object approaching the eyepiece, a touch-panel type display unit, a control unit configured to, when the approach detection unit detects the object approaching, provide control to reduce a light emission luminance of the display unit or turn off display on the display unit, a display control unit configured to, in a state in which the approach detection unit has not detected the object approaching, provide control so that a first-type display objects that execute assigned functions in response to touch operations are displayed farther from the approach detection unit on a display surface of the display unit than a second-type display objects that do not execute assigned functions even when touched, and an execution unit configured to, when a touch on any of the first-type display objects is detected, execute a function assigned to the first-type display object.

Accordingly, a second aspect of the present invention provides a control method for an image pickup apparatus which comprises a finder having an eyepiece, an approach detection unit configured to detect an object approaching the eyepiece, and a touch-panel type display unit, comprising a control step of, when the approach detection unit detects the object approaching, providing control to reduce a light emission luminance of the display unit or turn off display on the display unit, a display control step of, in a state in which the approach detection unit has not detected the object approaching, providing control so that display objects of a first type that execute assigned functions in response to touch operations are displayed farther from the approach detection unit on a display surface of the display unit than display objects of a second type that do not execute assigned functions even when touched, and an execution step of, when a touch on any of the first-type display objects is detected, executing a function assigned to the first-type display object.

Accordingly, a third aspect of the present invention provides a computer-readable non-transitory storage medium storing a program for causing an image pickup apparatus to execute a control method for the image pickup apparatus as described above.

According to the present invention, the likelihood that when a user operates a display screen with a fingertip while not looking through a viewfinder, the approach detection unit will falsely detect the user's fingertip can be reduced. This makes it less likely that erroneous operation resulting from the false detection by the approach detecting unit will occur.

Further features of the present invention will become apparent from the following description of exemplary embodiments (with reference to the attached drawings).

DESCRIPTION OF THE EMBODIMENTS

The present invention will now be described in detail with reference to the drawings showing embodiments thereof.

Figure 1:
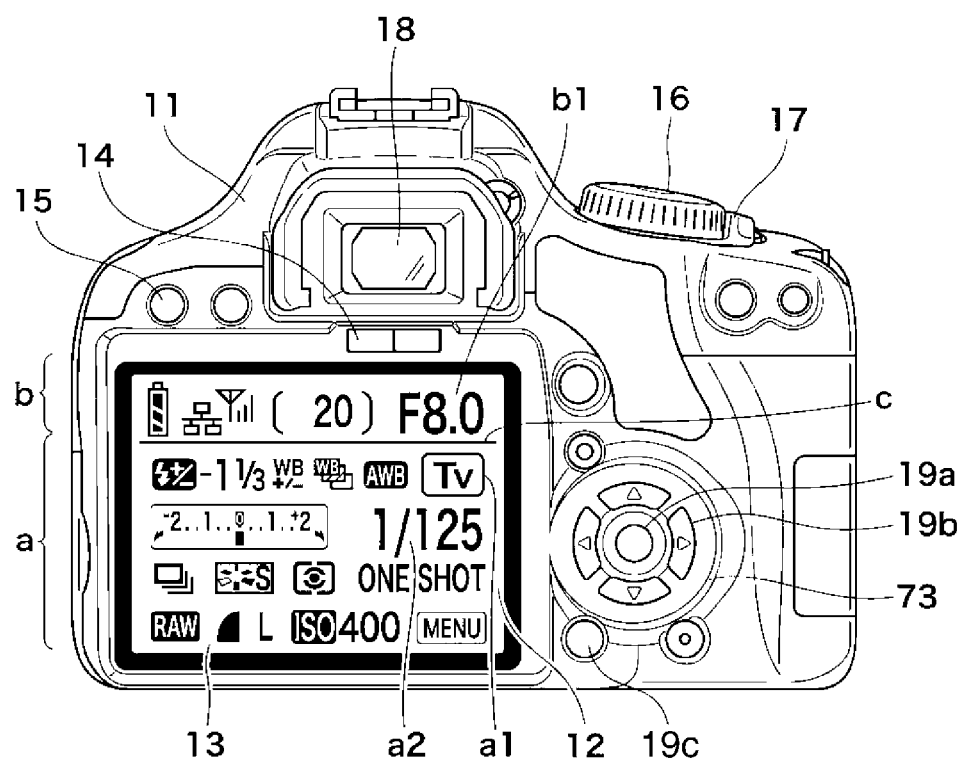
FIG. 1 is a view showing an appearance of a back side of a camera which is a first embodiment of the present invention.

FIG. 1 is a view showing an appearance of a back side of a digital single-lens reflex camera (hereafter abbreviated as the camera) 11 which is a first embodiment of the present invention. On a back side of the camera 11, there is provided a TFT liquid crystal display unit (hereafter referred to merely as the TFT) 12 which is an information display unit that displays taken images and settings, operating state, and so on of the camera 11.

A transparent transmissive touch panel (hereafter abbreviated as the touch panel) 13 is mounted on a surface of the TFT 12. The touch panel 13 detects not only whether or not a user's fingertip has touched the TFT 12, but also which area of the TFT 12 has been touched by the fingertip (touch position). Thus, which display area of the TFT 12 has been touched by the user can be determined by comparing contents displayed on the TFT 12 and a touch position with each other.

Figure 2:
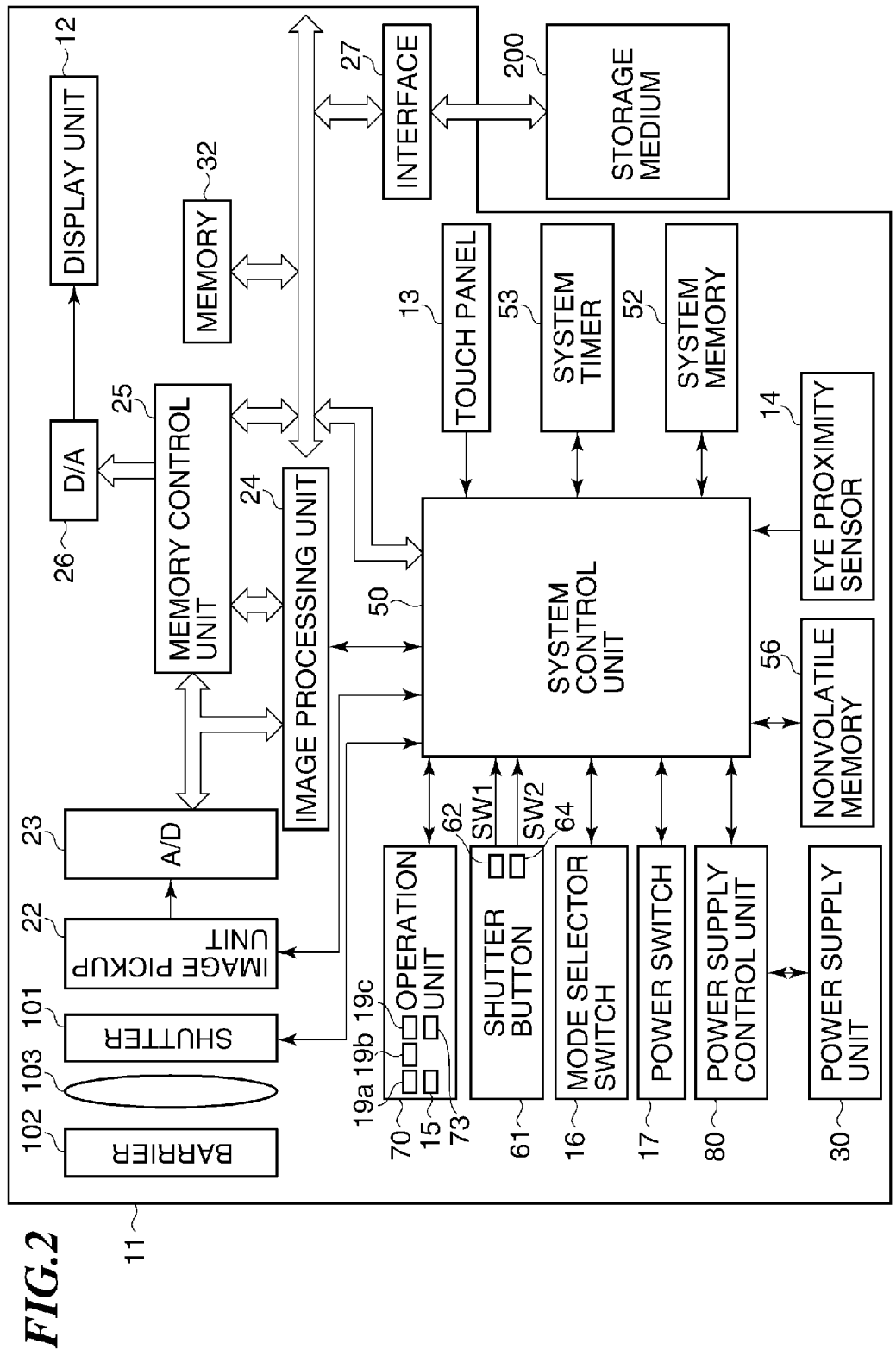
FIG. 2 is a block diagram schematically showing a hardware arrangement of the camera.

The camera 11 is also equipped with a number of operation switches such as a power switch lever 17, a mode dial 16, a menu button 15, and a shutter button 61 (see FIG. 2). The shutter button 61 instructs shooting. The mode dial (mode selector switch) 16 switches between modes. The menu button 15 receives operations by the user and configures settings of various functions of the camera 11. A set (SET) button 19a, a four-way button 19b, a replay button 19c, a controller wheel 73, and so on as well as the menu button 15 constitute an operation unit 70, to be described later. The power switch lever 17 selectively turns on and off power supply.

The camera 11 shoots a subject viewed through a viewfinder 18, and an eye proximity sensor 14 is provided below the viewfinder 18. The eye proximity sensor 14 detects the presence or absence of an object within a predetermined distance from a front surface of the eye proximity sensor 14. In the present embodiment, an ordinary infrared sensor that detects an infrared ray emitted from an object is used as the eye proximity sensor 14. This infrared sensor detects the user bringing his/her face close so as to look through the viewfinder 18. It should be noted that not only the infrared sensor but also an optical sensor having a light-emitting unit and a light-receiving unit, an ultrasonic sensor, or the like may be used as the eye proximity sensor 14.

FIG. 2 is a block diagram schematically showing a hardware arrangement of the camera 11. The camera 11 has a taking lens 103 including a focus lens, a shutter 101 having a diaphragm function, and an image pickup unit 22 comprised of a CCD, a CMOS device, or the like which converts an optical image into an electric signal.

Also, the camera 11 has an A/D converter 23, which converts an analog signal output from the image pickup unit 22 into a digital signal, and a barrier 102. The barrier 102 covers the taking lens 103 and others of the camera 11 to prevent an image pickup system including the taking lens 103, the shutter 101, and the image pickup unit 22 from becoming soiled and damaged.

An image processing unit 24 carries out a resizing process such as predetermined pixel interpolation and reduction, a color conversion process, on data from the A/D converter 23 and data from a memory control unit 25. The image processing unit 24 carries out a predetermined computation process using image data obtained by shooting, and a system control unit 50 carries out exposure control and photometry control based on the computation results. As a result, a TTL (through-the-lens)-type AF (auto focus) process, an AE (auto exposure) process, and an EF (flash pre-emission) process are carried out. Further, the image processing unit 24 carries out a predetermined computation process using image data obtained by shooting, and the system control unit 50 carries out a TTL-type AWB (auto white balance) process as well based on the computation results.

Output data from the A/D converter 23 is directly written into a memory 32 via the image processing unit 24 and the memory control unit 25, or via the memory control unit 25. The memory 32 stores image data, which is obtained by the image pickup unit 22 and converted into digital data by the A/D converter 23, and image data to be displayed on the TFT (display unit) 12. The memory 32 has a storage capacity enough to store a predetermined number of still images and moving images and sound for a predetermined time.

The memory 32 also serves as a memory for image display (video memory). A D/A converter 26 converts data for image display stored in the memory 32 into analog signals, and supplies them to the TFT 12. Thus, image data to be displayed, which is written into the memory 32, is displayed by the TFT 12 through the D/A converter 26.

The TFT 12 produces displays according to analog signals from the D/A converter 26 as described above. Thus, digital data, which is obtained by the A/D converter 23 converting analog data into digital data once, and accumulated in the memory 32, is converted into analog data by the D/A converter 26 and successively transferred to and displayed on the TFT 12, so that the TFT 12 acts as an electronic viewfinder (through image display).

A nonvolatile memory 56 is an electronically erasable and recordable memory. An EEPROM, for example, is used as the nonvolatile memory 56. Also, the nonvolatile memory 56 stores constants and programs, for operation of the system control unit 50. Here, the programs mean programs presented in flowcharts, to be described later, in the present embodiment.

The system control unit 50 controls the entire camera 11. The system control unit 50 executes the programs recorded in the nonvolatile memory 56. A RAM is used as a system memory 52, in which constants and variables for operation of the system control unit 50 are stored, and programs and others read out from the nonvolatile memory 56 are expanded.

Also, by controlling the memory 32, the D/A converter 26, the TFT 12, and so on, the system control unit 50 acts as a display control unit that controls display on the TFT 12.

A system timer 53 measures time periods required for various kinds of control, and time periods indicated by built-in clocks. The mode selector switch 16, the shutter button 61, and the operation unit 70 input various operational instructions to the system control unit 50.

The mode selector switch 16 selectively places the system control unit 50 into a still image recording mode, a moving image recording mode, a reproduction mode, and so on.

A first shutter switch 62 is turned on when the shutter button 61 provided with the camera 11 is pressed part way, that is, in response to the shutter button 61 being pressed halfway down (a shooting preparation instruction), and generates a first shutter switch signal SW1. In response to the first shutter switch signal SW1, the system control unit 50 starts an operation such as an AF (auto focus) process, an AE (auto exposure) process, an AWB (auto white balance) process, or an EF (flash pre-emission) process.

A second shutter switch 64 is turned on when operation of the shutter button 61 is completed, that is, in response to the shutter button 61 being pressed all the way down (a shooting instruction), and generates a second shutter switch signal SW2. In response to the second shutter switch signal SW2, the system control unit 50 starts a sequence of shooting processes leading from reading of a signal from the image pickup unit 22 to writing of image data into a recording medium 200.

The operation unit 70 is comprised of the menu button 15, the SET button 19a, the four-way button 19b, the replay button 19c, the controller wheel 73, and so on. Moreover, in the present embodiment, the touch panel 13 capable of detecting a touch on a display screen of the TFT 12 is provided separately from the operation unit 70. Various function icons displayed on the TFT 12 are selected and operated to assign functions to respective scenes, and thus touch panel 13 acts as various function buttons.

Examples of the function buttons include an end button, a back button, an image-by-image advance button, a jump button, a refine button, and an attribute change button. For example, when the menu button 15 is pressed, a menu screen on which various settings can be configured is displayed on the TFT 12. The user can intuitively configure various settings using the menu screen displayed on the TFT 12, the four-way button 19b, and the SET button 19a.

The controller wheel 73 is an operation member that is included in the operation unit 70 and can be rotationally operated, and is used together with the four-way button 19b to designate selection items. When the controller wheel 73 is rotationally operated, an electric pulse signal is generated according to the amount of operation. Based on the pulse signal, the system control unit 50 controls each part of the camera 11. Based on the pulse signal, an angle at which the controller wheel 73 has been rotationally operated, the number of rotations by the controller wheel 73, or the like can be determined. It should be noted that the controller wheel 73 may be anything which is an operation member capable of detecting a rotational operation. For example, the controller wheel 73 may be a dial operation member that rotates by itself and generates a pulse signal in response to a rotational operation by the user. Alternatively, the controller wheel 73 may be an operation member comprised of a touch sensor, and capable of detecting a finger rotating action made by the user on a controller wheel although the controller wheel does not rotate (a so-called touch wheel).

A power supply control unit 80 is comprised of a battery detection circuit, a DC-DC converter, a switch circuit that switches between blocks to be energized, and so on, and detects the presence or absence of a battery mounted, a battery type, and a remaining battery level. Also, based on the detection results and instructions from the system control unit 50, the power supply control unit 80 controls the DC-DC converter, and supplies required voltages to components including the recording medium 200 for a required period of time.

A power supply unit 30 is comprised of a primary battery such as an alkali battery or a lithium battery, a secondary battery such as an NiCd battery, an NiMH battery, an Li battery, an AC adapter, or the like. An interface 27 is an interface for connecting with the recording medium 200 such as a memory card or a hard disk. The recording medium 200 is comprised of a recording medium such as a memory card, a semiconductor memory, a magnetic disk, or the like.

A detailed description will now be given of the touch panel 13 provided separately from the operation unit 70. As described above, the touch panel 13 capable of detecting a touch on the display surface of the TFT 12 is provided on the display screen of the TFT 12. The touch panel 13 and the TFT 12 are configured integrally. For example, the touch panel 13 is attached to an upper layer of the display screen of the TFT 12, and the light transmittance of the touch panel 13 is set so as not to interfere with display on the TFT 12. Input coordinates on the touch panel 13 and display coordinates on the TFT 12 are associated with each other. This can provide a GUI that looks as if the user could directly manipulate a screen displayed on the TFT 12.

The system control unit 50 detects the following acts: an act of touching the touch panel 13 with a finger or a pen (hereafter referred to as "touch-down"), an act in a state in which a finger or a pen touches the touch panel 13 (hereafter referred to as "touch-on"), an act of moving a finger or a pen in a state in which the finger or the pen touches the touch panel 13 (hereafter referred to as "move"), an act of moving a finger or a pen off the touch panel 13 (hereafter referred to as "touch-up"), and an act in a state in which a finger or a pen does not touch the touch panel 13 (hereafter referred to as "touch-off").

These acts and coordinates of positions on the touch panel 13 touched by a finger or a pen are posted to the system control unit 50. Based on the posted information, the system control unit 50 determines what kind of manipulation has been performed on the touch panel 13.

Regarding move, a direction in which a finger or a pen is moved on the touch panel 13 can be determined with respect to each vertical component/horizontal component on the touch panel 13 based on a change in positional coordinates.

Moreover, when on the touch panel 13, touch-up is performed via a predetermined move after touch-down, it can be determined that a stroke is drawn. An act of quickly drawing a stroke is referred to as flicking. The flicking is an act of quickly moving a finger a certain distance on the touch panel 13 and then moving the finger off the touch panel 13, in other words, an act of quickly moving the finger over the touch panel 13 as if flicking the touch panel 13.

When it is detected that move is performed for a predetermined distance or longer and at a predetermined speed or higher, and then touch-up is detected as-is, it can be determined that flicking is performed. When it is detected that move is performed for a predetermined distance or longer and at a predetermined speed or lower, it can be determined that dragging is performed.

As the touch panel 13, an arbitrary one of various types such as a resistive type, a capacitance type, a surface acoustic wave type, an infrared type, an electromagnetic induction type, an image recognition type, and an optical sensor type can be used.

Figure 3A:
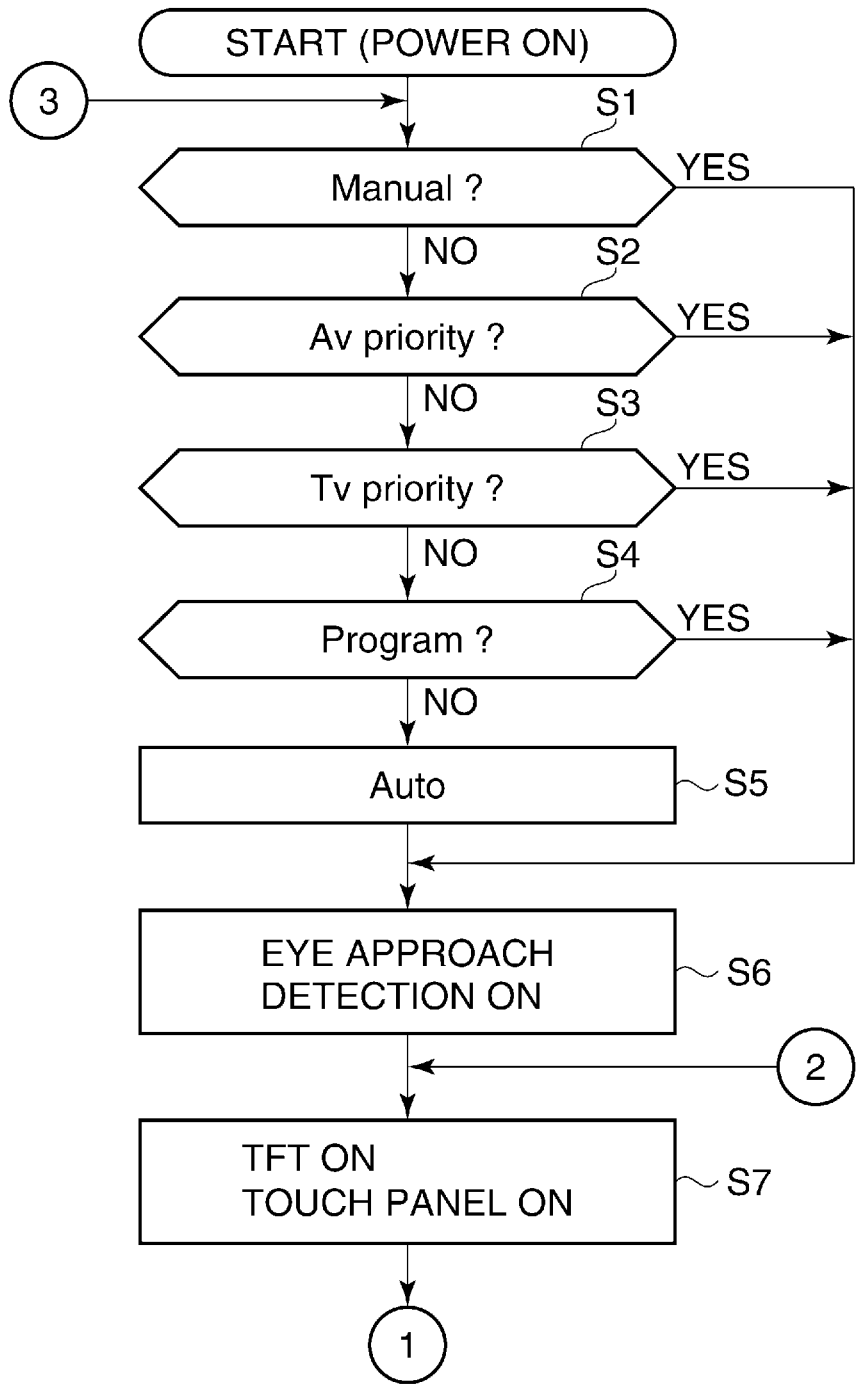
FIGS. 3A and 3B are flowcharts of operating procedures of the camera.
Figure 3B:
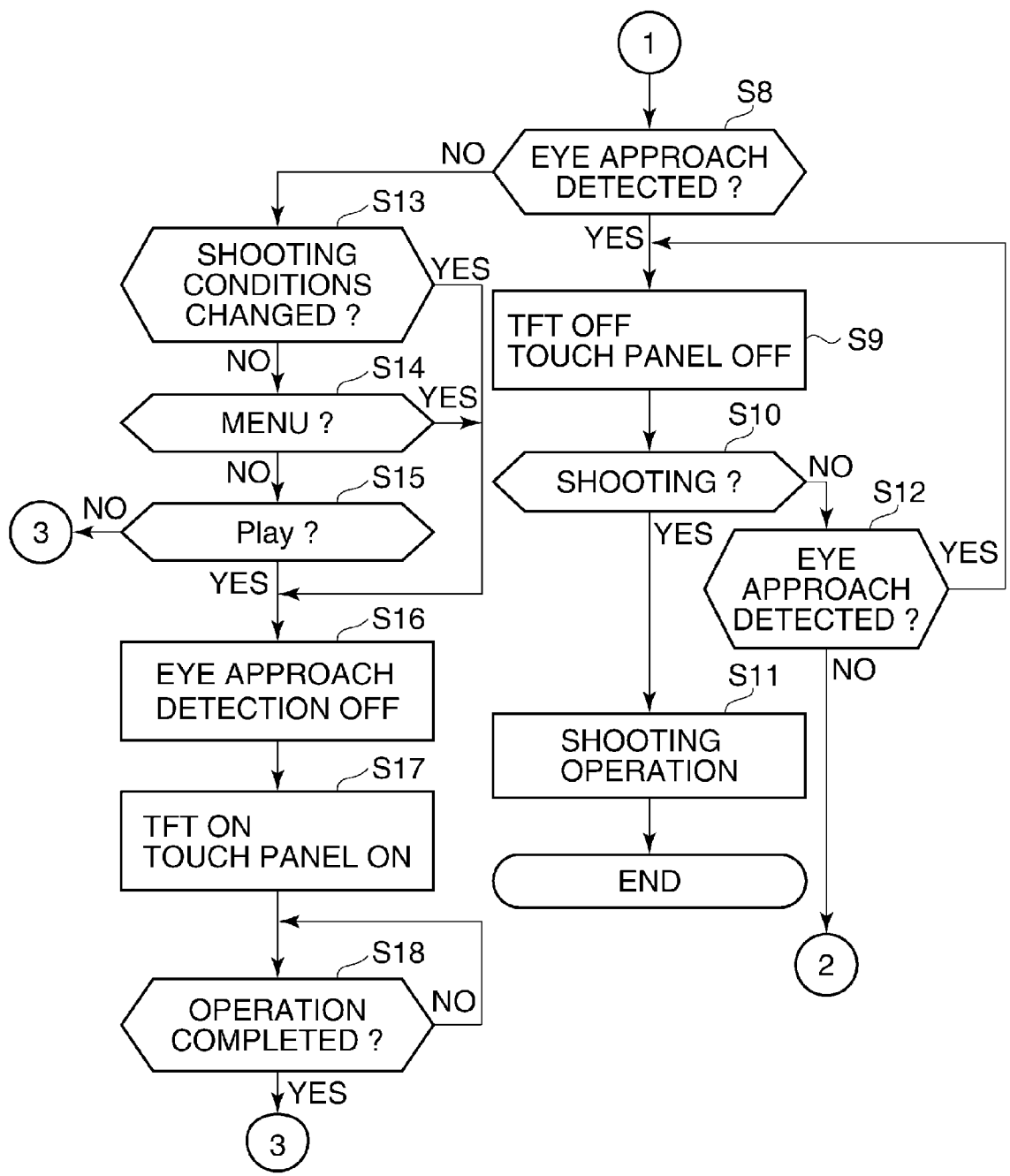

Next, a description will be given of how the camera 11 arranged as described above operates. FIGS. 3A and 3B are flowcharts of operating procedures of the camera 11. These flowcharts are implemented by a CPU in the system control unit 50 executing a method in accordance with a program which is stored in the nonvolatile memory 56 and loaded into the system memory 52.

When the power switch lever 17 of the camera 11 is operated, the system control unit 50 detects this operation, and supplies power to the components via the power supply control unit 80, thus causing the camera 11 to start operating. First, the system control unit 50 detects a shooting mode as a mode of the camera 11. The shooting mode is detected by detecting a position of the mode dial 16 (steps S1 to S5).

Namely, the system control unit 50 detects a position of the mode dial 16 to determine whether or not the camera 11 is in a manual mode (step S1). When the camera 11 is in the manual mode, the system control unit 50 proceeds to step S6. On the other hand, when the camera 11 is not in the manual mode, the system control unit 50 determines whether or not the camera 11 is in an aperture priority mode (step S2).

The aperture priority mode means a mode in which an operation to adjust aperture value is received from the user, and shutter speed is automatically determined using a program diagram based on an aperture value, ISO sensitivity, subject brightness, and so on set according to operation by the user. When the camera 11 is in the aperture priority mode, the system control unit 50 proceeds to the step S6. On the other hand, when the camera 11 is not in the aperture priority mode, the system control unit 50 determines whether or not the camera 11 is in a shutter speed priority mode (step S3).

The shutter speed priority mode means a mode in which an operation to adjust shutter speed is received from the user, and aperture value is automatically determined using a program diagram based on a shutter speed, ISO sensitivity, subject brightness, and so on set according to operation by the user. When the camera 11 is in the shutter speed priority mode, the system control unit 50 proceeds to the step S6. On the other hand, when the camera 11 is not in the shutter speed priority mode, the system control unit 50 determines whether or not the camera 11 is in a program mode (step S4).

When the camera 11 is in the program mode, the system control unit 50 proceeds to the step S6. On the other hand, when the camera 11 is not in the program mode, the system control unit 50 determines that the camera 11 is in an auto mode (step S5), and proceeds to the step S6.

Then, the system control unit 50 turns on (enables) and operates the eye proximity sensor 14 with consideration given to the user looking through the viewfinder 18 for the purpose of shooting (step S6). It should be noted that the process in the step S6 is realized as a function of an approach detection switching unit. Further, the system control unit 50 displays data having contents determined in advance (Data1) on the TFT 12 according to the previously detected position of the mode dial 16, and operates the touch panel 13 (step S7). It should be noted that the process in the step S7 is realized as a function of an input detection switching unit.

Figure 4A:
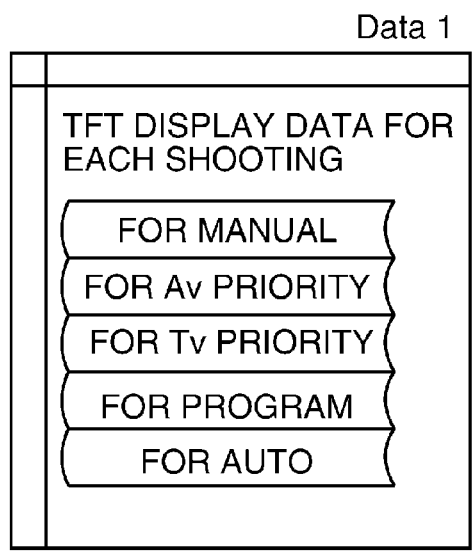
FIGS. 4A and 4B are diagrams showing data displayed on a TFT.
Figure 4B:
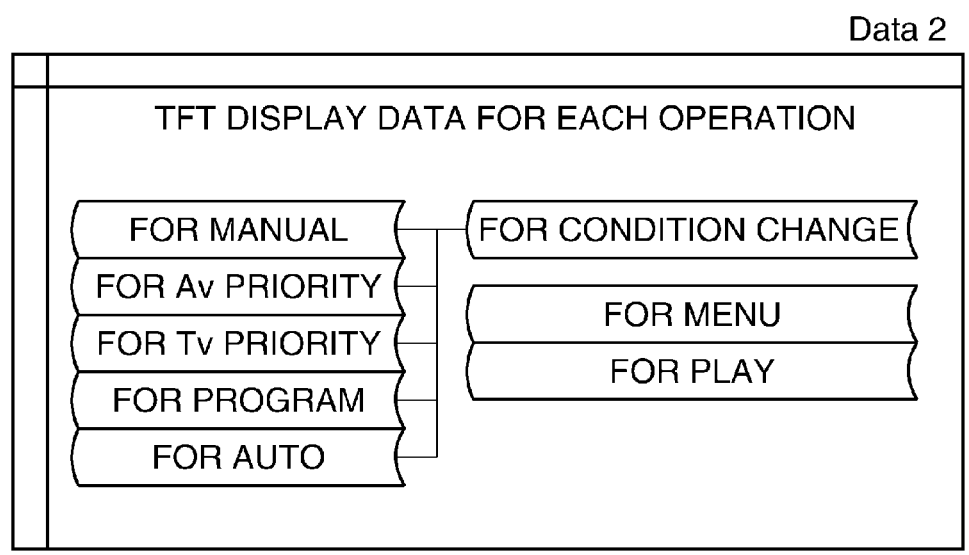

FIGS. 4A and 4B are diagrams showing data displayed on the TFT 12. Data1 and Data2 are stored in the nonvolatile memory 56. Data for the manual mode, aperture priority mode, shutter speed priority mode, program mode, or auto mode is prepared as the data Data1 on the TFT 12 in the step S7.

The system control unit 50 determines whether or not an object has been detected by the eye proximity sensor 14 (step S8). As described above, when an infrared sensor is used as the eye proximity sensor 14, and the user has looks through the viewfinder 18 for the purpose of shooting, the eye proximity sensor 14 detects an approach of the user's face or eye. In response to the detection by the eye proximity sensor 14, the system control unit 50 turns off the TFT 12, and stops the touch panel 13 (step S9). It should be noted that the process in the step S9 is realized as a function of the input detection switching unit. In the step S9, only luminance may be lowered without turning off the TFT 12.

The system control unit 50 determines whether or not shooting is performed by the user depressing the shutter button 61 (step S10). When shooting is performed, the system control unit 50 causes the camera 11 to take a shooting action (step S11). Thereafter, the system control unit 50 terminates the present process.

On the other hand, when shooting is not performed in the step S10, the system control unit 50 determines whether or not an object is detected by the eye proximity sensor 14 so as to check whether or not the user has stopped shooting and moves his/her face off the viewfinder 18 (step S12). When an object is detected by the eye proximity sensor 14, the system control unit 50 proceeds to the step S9. On the other hand, when an object is not detected by the eye proximity sensor 14, the system control unit 50 returns to the step S7, in which it produces a display on the TFT 12 and operates the touch panel 13 again.

On the other hand, when in the step S8, the user changes shooting conditions such as shutter speed or operates the menu button 15 or the replay button 19c without looking through the viewfinder 18, the system control unit 50 carries out processes in step S13 and the subsequent steps. Specifically, when an object is not detected in the step S8, the system control unit 50 determines whether or not shooting conditions are changed (step S13).

When the shooting conditions are changed, the system control unit 50 proceeds to the step S16. On the other hand, when the shooting conditions are not changed, the system control unit 50 determines whether or not the menu button 15 is depressed (step S14).

When the menu button 15 is depressed, the system control unit 50 proceeds to the step S16. On the other hand, when the menu button 15 is not depressed, the system control unit 50 determines whether or not the replay button 19c is depressed (step S15).

When the replay button 19c is depressed, the system control unit 50 proceeds to the step S16. On the other hand, when the replay button 19c is not depressed, the system control unit 50 returns to the step S1.

When the user changes shooting conditions such as shutter speed or operates the menu button 15 or the replay button 19c, the system control unit 50 turns off (disables) and stops the operation of the eye proximity sensor 14 (step S16). It should be noted that the process in the step S16 is realized as a function of the approach detection switching unit. This is because when the menu button 15 or the replay button 19c is operated, it can be determined that the user is going to perform an operation other than shooting.

Further, the system control unit 50 displays data with contents determined in advance (Data2) in response to operations by the user with data being displayed on the TFT 12 and the touch panel 13 being in operation (step S17). As shown in FIG. 4B, data for changing of shooting conditions, menu, and reproduction is displayed as data relating to operations.

Then, the system control unit 50 waits until the user completes various operations (step S18). When various operations by the user are completed, the system returns to the step S1.

A description will now be given of display on the TFT 12. Display objects representing various information of which settings can be changed by the user (hereafter referred to as the first-type display objects) are displayed in a display range a below a boundary line c. On the other hand, display objects representing various information of which settings cannot be changed by the user (hereafter referred to as the second-type display objects) are displayed in a display range b above the boundary line c.

The first-type display objects are display objects which enable functions assigned thereto to be executed by touching an area where the first-type display objects are displayed. Namely, the first-type display objects are display objects on which touch operations can be performed (touch objects). For example, a first-type display object "Tv" representing the shutter speed priority mode displayed on the TFT 12 in FIG. 1 is information that can be changed by the user operating the mode dial 16. The user can also switch to another shooting mode by touching a display area a1 on the touch panel 13 where the display object "Tv" is displayed and then touching the touch panel 13 according to a display guidance, not shown.

Also, a first-type display object "1/125" indicating a shutter speed is information that can be changed by operating a setting change dial, not shown. The user can switch to another shutter speed by touching a display area a2 on the touch panel 13 where the display object "1/125" is displayed and then touching the touch panel 13 according to a display guidance, not shown. The same applies to other display objects.

The second-type display objects represent information which does not cause operations of the camera 11 to be input even when areas where the second-type display objects are displayed are touched. Namely, the second-type display objects are display objects on which touch operations cannot be performed. The display range b is a touch disabled range. For example, an aperture value "F8.0" as a second-type display object displayed on the TFT 12 in FIG. 1 is a number that is automatically determined by a shutter speed, ISO sensitivity (ISO 400 in FIG. 1) set by the user, and subject brightness when the camera 11 is in the shutter speed priority mode. Thus, this cannot be changed by the user. Also, a remaining battery level displayed at an upper left corner of the TFT 12 is determined by a remaining battery level of a mounted battery, and thus this cannot be changed by the user. As other exemplary displays, shutter speed in the aperture priority mode, and shutter speed and aperture value in the program mode cannot be changed by the user.

Thus, display objects indicating shutter speed in the aperture priority mode, and shutter speed and aperture value in the program mode are displayed in the display range b as the second-type display objects on which touch operations cannot be performed. Also, the number of pictures that can be taken, burst frame count, radio field intensity, LAN connection, USB connection, HDMI connection, AV-OUT connection, and MIC/SP connection, and so on cannot be changed by the user, and hence they are displayed in the display range b as the second-type display objects on which touch operations cannot be performed.

It should be noted that in the present embodiment, the display range b where the second-type display objects are displayed is located above the boundary line c, and the display range a where the first-type display objects are displayed is located below the boundary line c. However, whether they are displayed above or below the boundary line c can be arbitrarily determined according to the number of first-type and second-type display objects or the like. Also, the boundary line may not always be horizontal, but may be oblique or curved.

The camera 11 displays, on the screen of the TFT 12, the second-type display objects closer to the eye proximity sensor 14 than the first-type display objects based on the data (Data1) in FIG. 4A at least when the eye proximity sensor 14 is in an enabled condition. As described earlier, the second-type display objects are indicating unchangeable information that does not enable operations of the camera 11 to be input even when the display range b where the second-type display objects are displayed is touched. On the other hand, the first-type display objects are indicating changeable information that enables operations of the camera 11 to be input by touching the display range a where the first-type display objects are displayed is touched.

Because the first-type display objects which the user is going to touch are displayed at positions away from the eye proximity sensor 14 as described above, the likelihood of the eye proximity sensor 14 falsely detecting a fingertip of the user can be reduced. Namely, the display area b1 where an aperture value and others in the shutter speed priority mode are displayed can be a safe area where the eye proximity sensor 14 is not likely to falsely detect a fingertip of the user. Thus, the likelihood of the camera 11 failing to work properly can also be reduced.

Conversely, this is not limitative when the eye proximity sensor 14 is in a disabled condition, that is, in the processes in steps S16 to S18. In other words, no particular problem will arise if the camera 11 displays even the first-type display objects close to the eye proximity sensor 14 based on the data (Data2) in FIG. 4B.

As described above, according to the image pickup apparatus of the first embodiment, the second-type display objects are displayed in the display range on the TFT closer to the eye proximity sensor than the first-type display objects. Thus, when the user operates the touch panel with a fingertip while not looking through the viewfinder, the likelihood that the eye proximity sensor will falsely detect the user's fingertip as the face can be reduced, and a malfunction of the camera resulting from false detection by the eye proximity sensor is less likely to occur.

Moreover, when an object is detected by the eye proximity sensor, the touch panel is switched into a disabled condition, and hence, for example, when the user's nose or the like touches the screen of the TFT while the user looks through the viewfinder, this is not falsely detected as an operation. Because the eye proximity sensor can be selectively enabled or disabled, the operability of the camera can be enhanced. Moreover, when the user looks through the viewfinder in the shooting mode, the eye proximity sensor detects this, and the screen of the TFT is turned off. This can prevent the user from feeling glare from the screen of the TFT at the time of shooting. Further, because the eye proximity sensor is switched into a disabled condition when the camera is not in the shooting mode, the display mode of the screen of the TFT is not changed, making it easier to operate the camera.

Moreover, the area where shutter speed value in the aperture priority mode is displayed can be a safe area where the eye proximity sensor is less likely to falsely detect the user's fingertip. The same applies to the areas where aperture value in the shutter speed priority mode, and shutter speed value and aperture value in the program mode are displayed.

Figure 5:
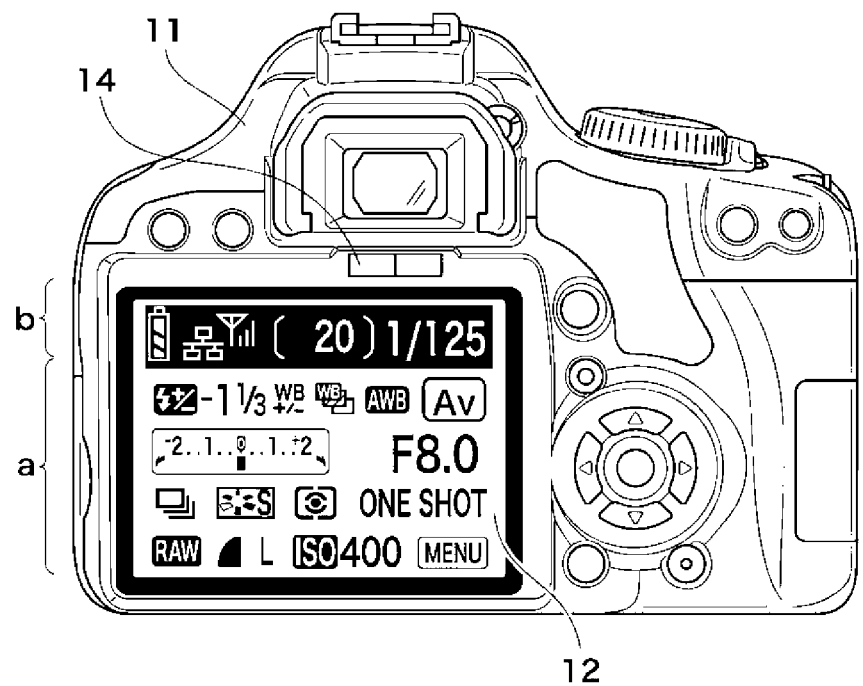
FIG. 5 is a view showing an appearance of a back side of a camera which is a second embodiment of the present invention.

FIG. 5 is a view showing an appearance of a back side of the camera 11 which is a second embodiment of the present invention. The arrangement and operation of the camera 11 are substantially the same as in the first embodiment described above. The components same as those of the first embodiment are designated by the same reference symbols, detailed description of which, therefore, is omitted. Only those differing from the first embodiment will be described below.

In the camera 11 according to the second embodiment, the second-type display objects are displayed in a negative-positive reversed manner against the first-type display objects. This makes the difference between the first-type display objects and the second-type display objects visibly clear.

When operating the touch panel of the TFT 12, the user can visually recognizes at a glance that a second-type display object which he/she is going to touch does not lie close to the eye proximity sensor 14. As a result, the likelihood of the user putting a fingertip close to the eye proximity sensor 14 can be further reduced, and the same effects as in the first embodiment can be more reliably obtained.

Figure 6:
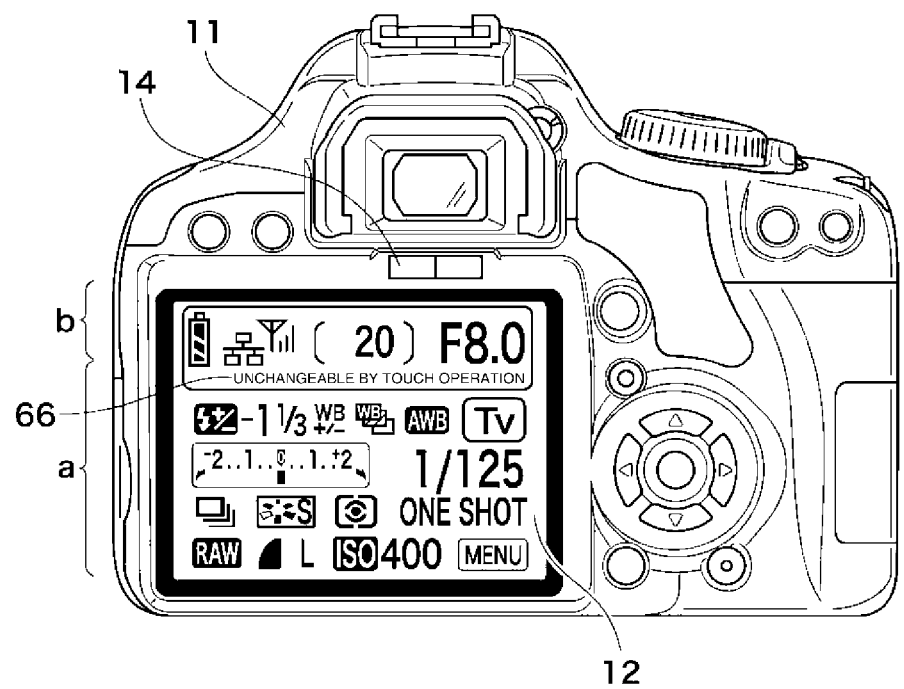
FIG. 6 is a view showing an appearance of a back side of a camera which is a third embodiment of the present invention.
Figure 7:
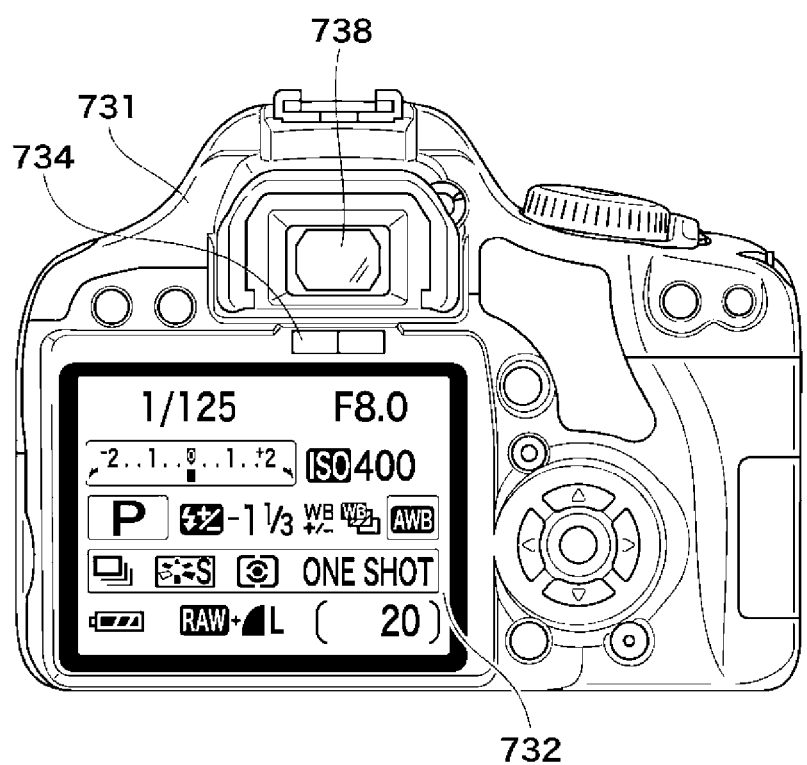
FIG. 7 is a view showing an appearance of a back side of a conventional digital single-lens reflex camera.

FIG. 6 is a view showing an appearance of a back side of the camera 11 which is a third embodiment of the present invention. The arrangement and operation of the camera 11 are substantially the same as in the first embodiment described above. The components same as those of the first embodiment are designated by the same reference symbols, detailed description of which, therefore, is omitted. Only those differing from the first embodiment will be described below.

In the camera 11 according to the third embodiment, a display 66 indicating that the second-type display objects cannot be changed by the user is displayed close to the second-type display object. Thus, when operating the touch panel of the TFT 12, the user visually can recognize at a glance that a display range which he/she is going to touch is not close to the eye proximity sensor 14. As a result, the likelihood that the user will put the fingertip close to the eye proximity sensor 14 can be further reduced, and the same effects as in the first embodiment can be more reliably obtained.

Next, a description will be given of a camera as an image pickup apparatus according to a fourth embodiment of the present invention.

A camera 40 according to the fourth embodiment is arranged such that the TFT 12 is disposed on a vari-angle display unit (a second housing) rotatably mounted on a main body (a first housing) of the camera 11 shown in FIG. 1 such as to be able to open and close, and touch operations on display objects can be accepted regardless of whether they are in the display range a or b only when the vari-angle display unit occupies a certain position.

A hardware arrangement (not shown) of the camera 40 according to the fourth embodiment adds, to the hardware arrangement shown in the block diagram of FIG. 2, a position detection unit that is capable of communicating with the system control unit 50 and detects a position of the vari-angle display unit, and a dial 803 included in the operation unit 70.

FIGS. 8A to 8D are diagrams useful in explaining positions to which the vari-angle display unit 801 mounted on the camera 40 can move, and positions of the vari-angle display unit 801 mounted on the camera 40 can take. It should be noted that in FIGS. 8A to 8D, the components same as those in FIG. 1 are designated by the same reference symbols.

Figure 8A:
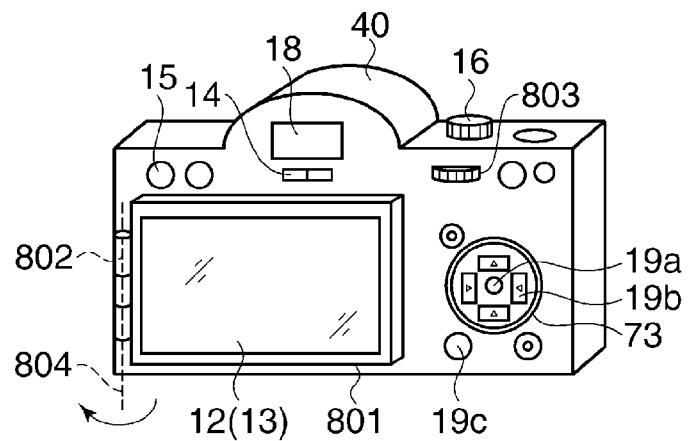
FIGS. 8A to 8D are diagrams showing positions of a vari-angle display unit mounted on a camera which is a fourth embodiment of the present invention.
Figure 8B:
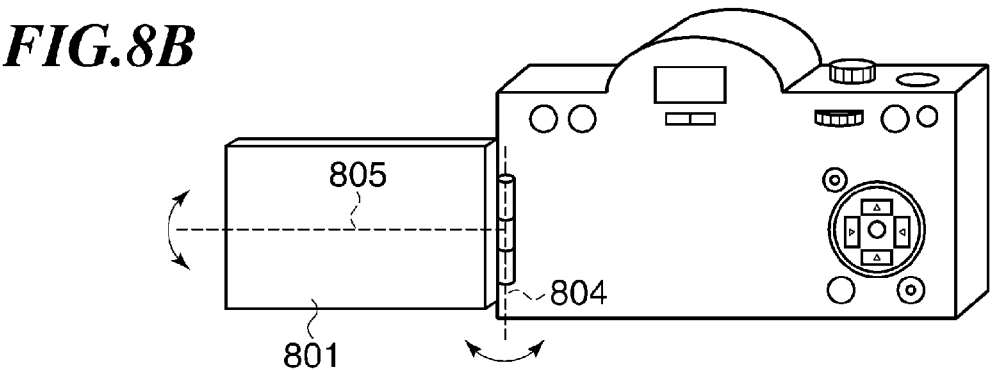
Figure 8C:
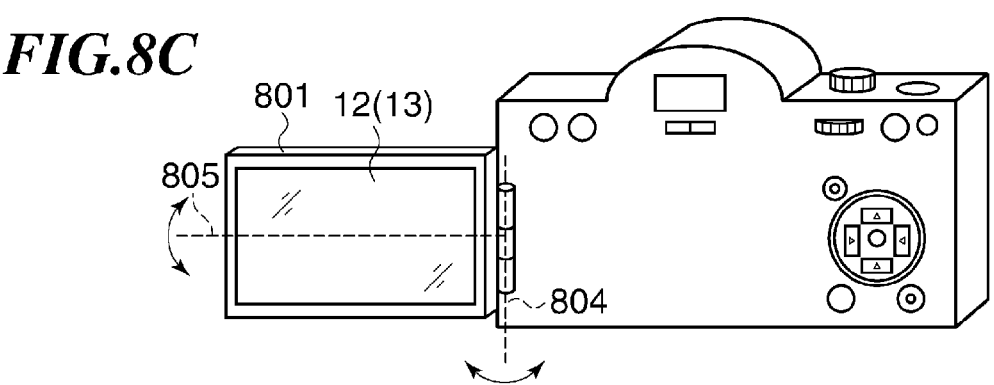
Figure 8D:
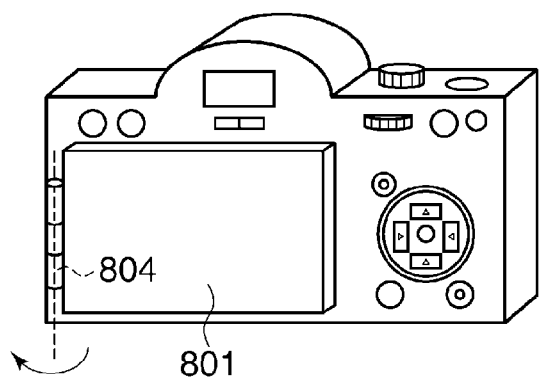

Referring to FIG. 8A, the vari-angle display unit 801 is rotatably connected to the camera 40 via a hinge unit 802 such as to be able to open and close. On the vari-angle display unit 801, the TFT 12 and the touch panel 13 are disposed.

A word "UP" written in the figures is a symbol of convenience for indicating orientations of the vari-angle display unit 801. The dial 803 is a rotary operation member, which can be operated through clockwise and counterclockwise rotations. Various setting values can be adjusted by increasing and decreasing according to the direction in which the dial 803 is rotated and the amount by which the dial 803 is rotated.

Positions of the vari-angle display unit 801 can be detected based on, for example, a hall element that is mounted inside the hinge unit 802 to serve as a position detection member of the vari-angle display unit 801, a switch that is turned on at a specific angle, or the like.

The system control unit 50 can detect at least positions A to D described below as positions of the vari-angle display unit 801.

Position A: Position Shown in FIG. 8A

A position in which the vari-angle display unit 801 is closed (folded) on a main body of the camera 40 so that the display surface of the TFT 12 can face in the same direction as a surface on which the eye proximity sensor 14 is mounted (a back side of the camera 40). The display surface of the TFT 12 is viewable from behind the camera 40. From this position A, the vari-angle display unit 801 can be rotated about an axis 804 (an axis vertical to the direction of an optical axis and parallel to a vertical direction of the camera 40 (this rotation will hereafter be referred to as "opened and closed").

Position B: Position Shown in FIG. 8B

A position in which the vari-angle display unit 801 is opened against the main body of the camera 40 so that the display surface of the TFT 12 can face in a direction opposite to the surface on which the eye proximity sensor 14 is mounted (the back side of the camera 40). The display surface of the TFT 12 faces in the same direction as a front surface of the camera 40, and the display surface of the TFT 12 is viewable from a subject standing in front of the camera 40. Namely, the position B is a position of the vari-angle display unit 801 opened after having been rotated about the axis 804 from the position A. From this position B, the vari-angle display unit 801 can be opened and closed about the axis 804. Also, the vari-angle display unit 801 can be opened and closed about an axis 805 (an axis vertical to the axis 804).

Position C: Position Shown in FIG. 8C

A position in which the vari-angle display unit 801 is opened against the main body of the camera 40 so that the display surface of the TFT 12 can face in the same direction as the surface on which the eye proximity sensor 14 is mounted (the back side of the camera 40). The display surface of the TFT 12 is viewable from behind the camera 40. The position C is a position of the vari-angle display unit 801 having been rotated about the axis 805 from the position B, and in the position C, upper and lower portions of the vari-angle display unit 801 are reversed from upper and lower portions of the vari-angle display unit 801 in the positions A and B. From the position C, the vari-angle display unit 801 can be opened and closed about the axis 804. Also, the vari-angle display unit 801 can be opened and closed about the axis 805.

Position D: Position Shown in FIG. 8D

A position in which the vari-angle display unit 801 is closed on the main body of the camera 40 so that the display surface of the TFT 12 can face the eye proximity sensor 14 (the back side of the camera 40). The display surface of the TFT 12 is not viewable from any direction. The position D is a position of the vari-angle display unit 801 closed after having been rotated about the axis 804 from the position C. From this position D, the vari-angle display unit 801 can be opened and closed about the axis 804.

Figure 9A:
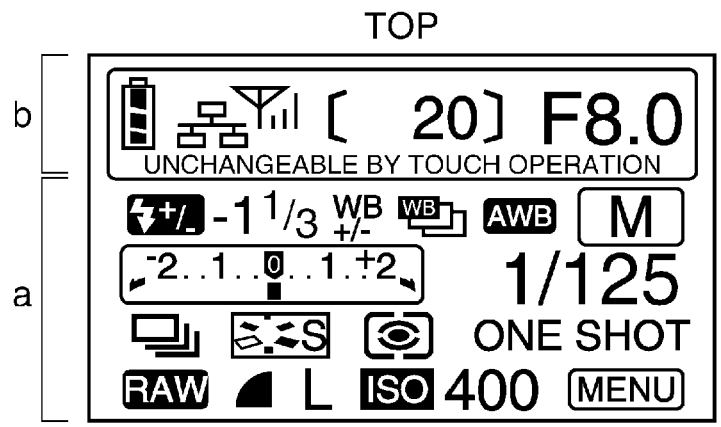
FIGS. 9A to 9C are diagrams showing exemplary screen displays on the TFT when the vari-angle display unit is in the positions shown in FIGS. 8A to 8C.
Figure 9B:
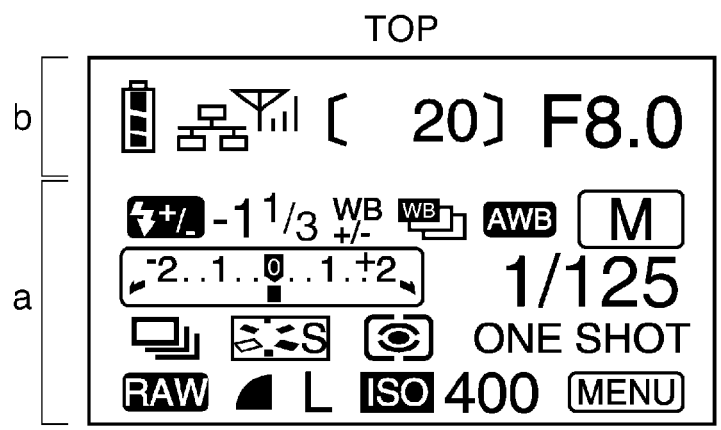
Figure 9C:
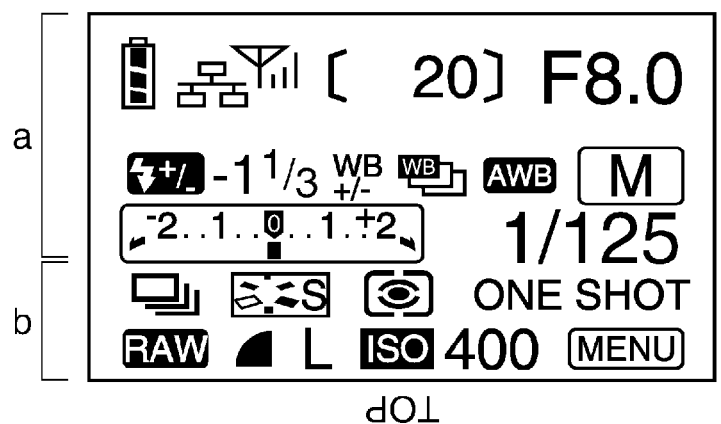
Figure 10A:
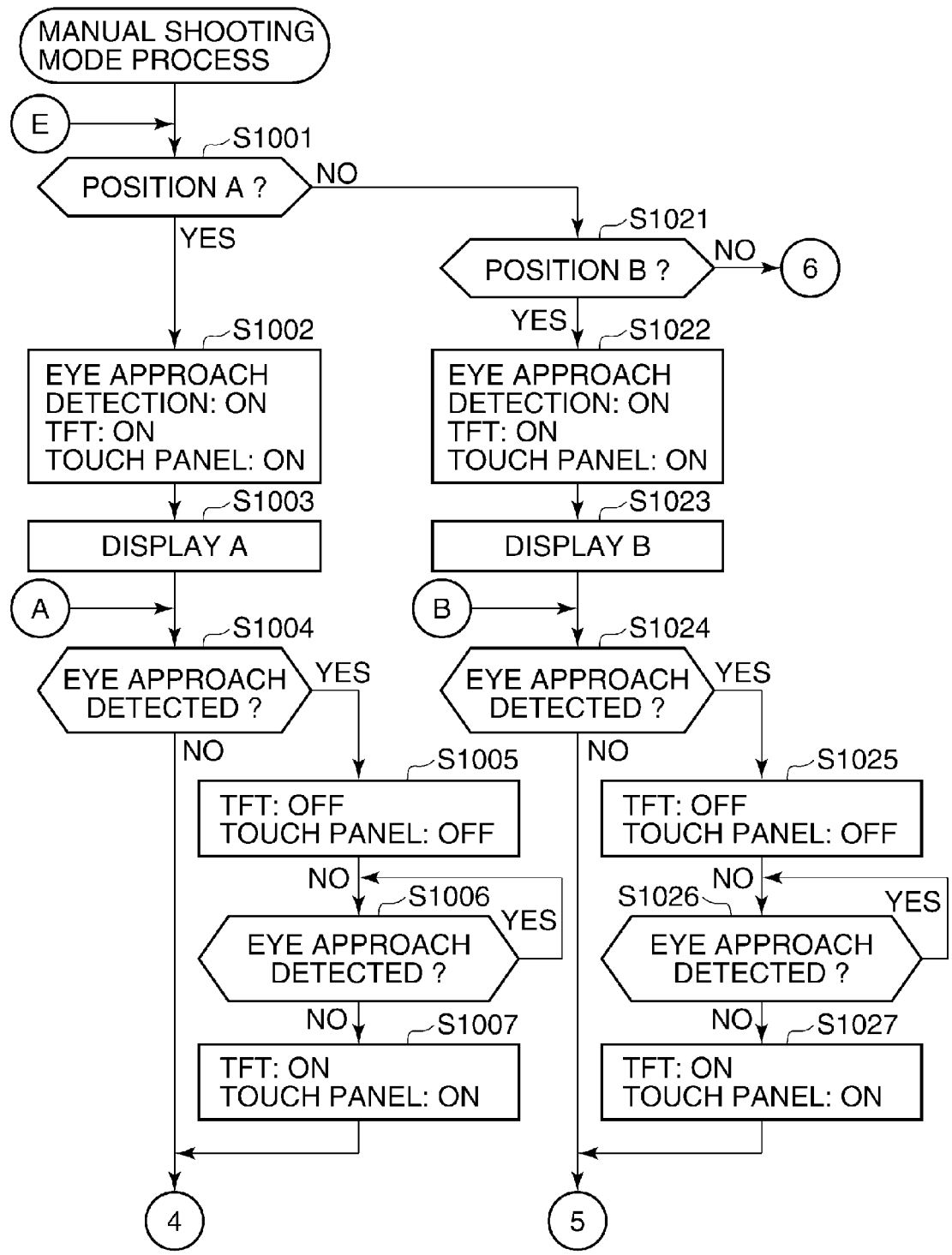
FIGS. 10A to 10D are flowcharts of operating procedures in a manual shooting mode according to the fourth embodiment.
Figure 10B:
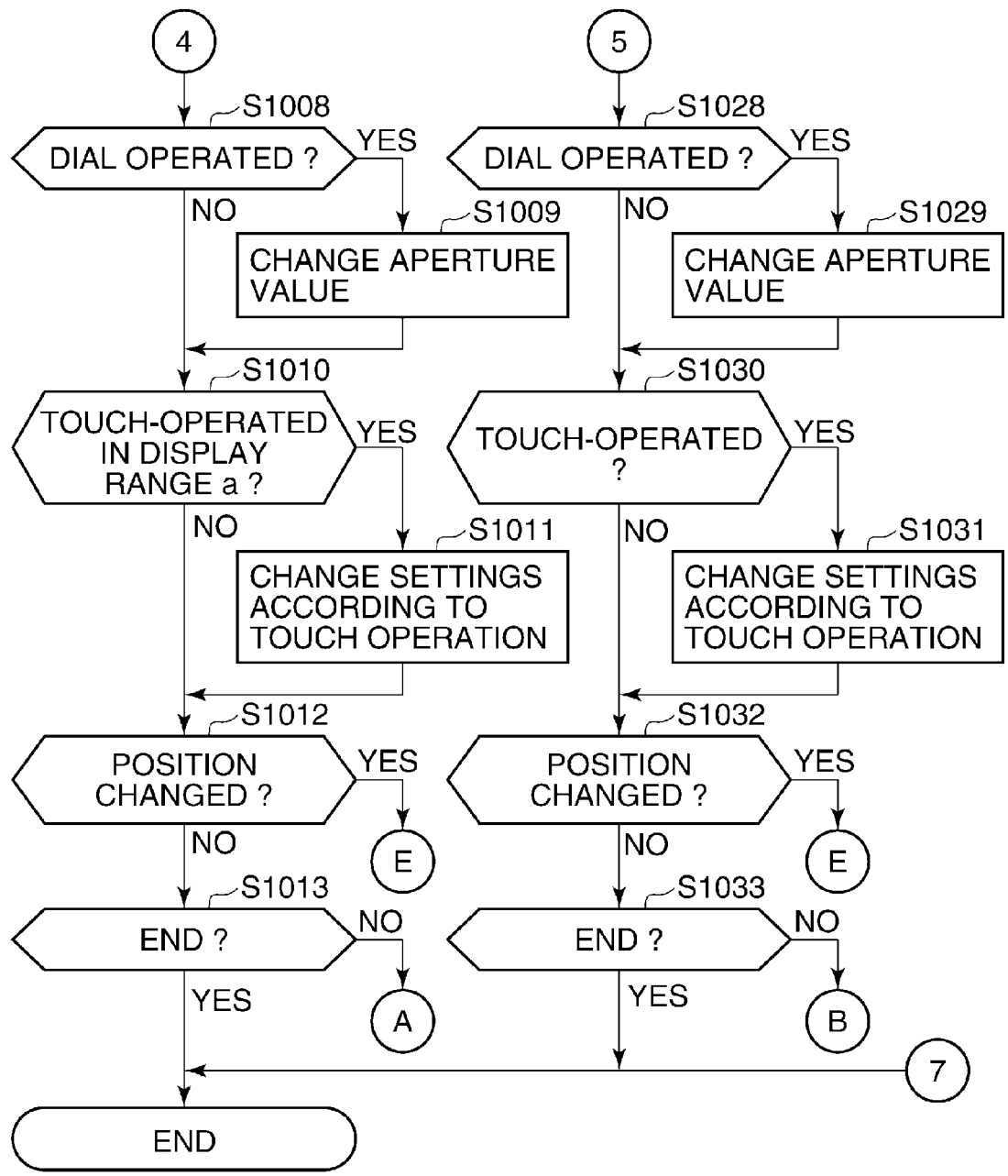
Figure 10C:
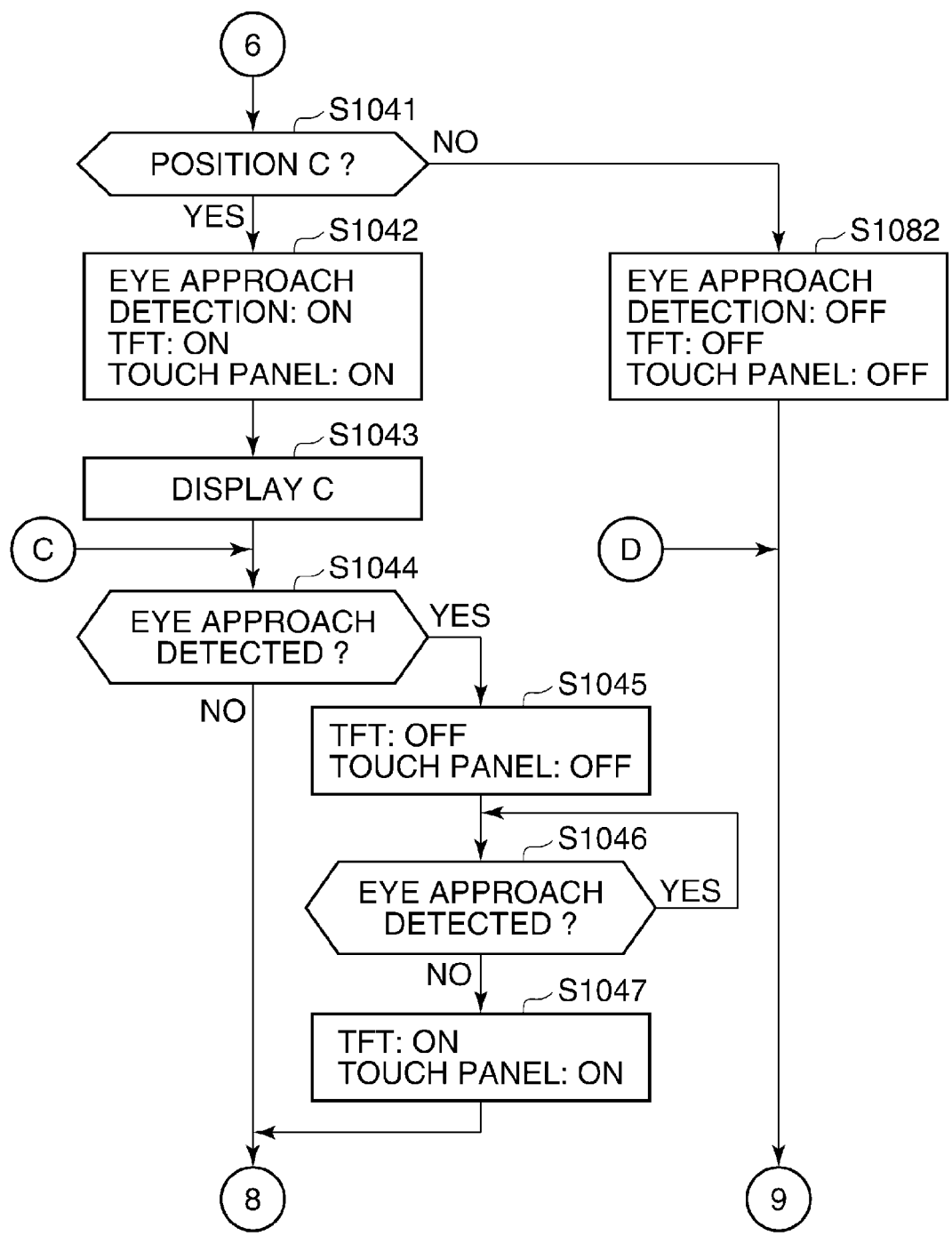
Figure 10D:
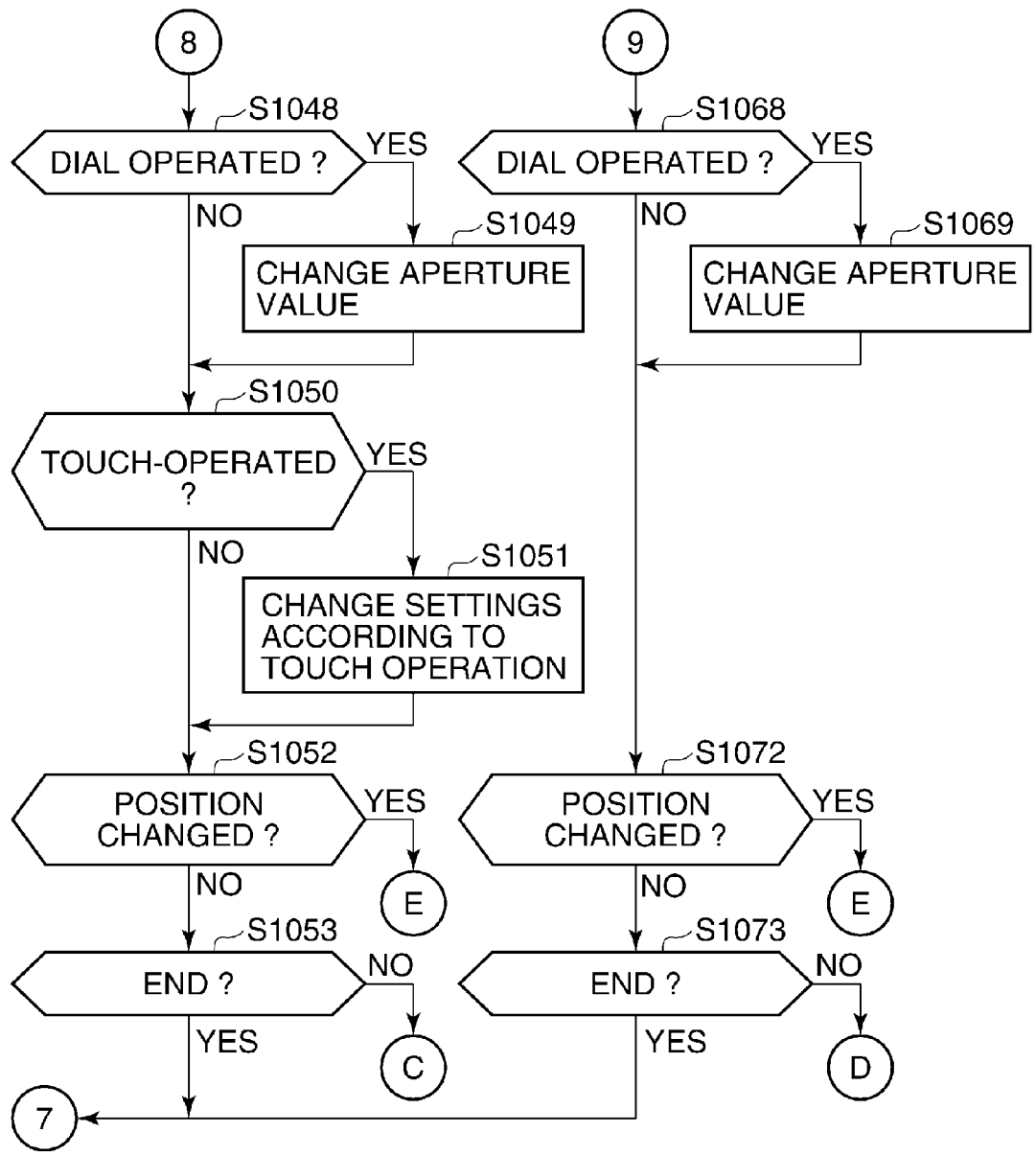

FIGS. 9A to 9C show exemplary screen displays on the TFT 12 when the vari-angle display unit 801 is in the positions described above with reference to FIGS. 8A to 8C. Here, a description will be given of exemplary screen displays in a manual shooting mode (a mode in which the user can adjust both shutter speed and aperture value).

FIG. 9A shows an exemplary screen display on the TFT 12 when the vari-angle display unit 801 is in the position A. When the vari-angle display unit 801 is in the position A, display objects displayed in the display range b which is an upper part of the TFT 12 (the range close to the eye proximity sensor 14) are configured so as not to be touch-operated. For example, a display object displayed in the display range b and indicating an aperture value (f number) (a display "F8.0" in FIG. 9A) indicates a shooting condition presently set for the camera 40, but nothing occurs when this display object is touched. In the display range b, a guidance indicating that display objects in this range cannot be touch-operated is displayed. On the other hand, the first-type display objects that can be touch-operated are arranged and displayed in the display range a (the range farther away from the eye proximity sensor 14 than the display range b). For example, by touching a display object indicating a shutter speed (Tv value) displayed in the display range a (a display "1/125" in FIG. 9A), a display for changing the shutter speed is produced, and further, by touch-operating this display object, the shutter speed can be changed.

Thus, as in the first to third embodiments described above, the reason why the availability of operation of display objects is changed according to display range is that in the position A, the display range b is close to the eye proximity sensor 14, and hence by not placing display members that can be touch-operated in this range, the likelihood that the user will put his/her finger in the vicinity of this range can be reduced. As a result, the likelihood that the TFT 12 will unexpectedly turn off, or operation of the touch panel 13 will become impossible due to the eye proximity sensor 14 falsely detecting an approach of the user's finger as an approach of the eye can be reduced.

It should be noted that shooting conditions indicated by the second-type display objects displayed in the display range b where touch operations are not accepted are not changeable by touch operations, but they are configured to be changeable through operation of other operation members disposed at locations other than the touch panel 13. For example, in the present embodiment, an aperture value indicated by a second-type display object "F8.0", which is displayed in the display range b and cannot be touch-operated in the position A, is changeable through operation of the dial 803.

FIG. 9B shows an exemplary screen display on the TFT 12 when the vari-angle display unit 801 is in the position B. In the position B, the display surface of the TFT 12 and the touch panel 13 face in a direction opposite to and away from the eye proximity sensor 14. Thus, the possibility of the eye proximity sensor 14 falsely detecting an approach of the hand trying to touch the touch panel 13 as an approach of the eye can be eliminated. Thus, all of display objects indicating shooting conditions displayed on the TFT 12 are configure to accept touch operations irrespective of the range where they are displayed. Namely, touch operations on display objects displayed in the display range b, which cannot be touch-operated in the position A, are also accepted. For example, by touching an area where a display object "F8.0" indicating an aperture value displayed in the display range b, a display for changing the aperture value is produced, and further by performing touch operations, the aperture value can be changed.

In the position B, because display objects displayed in the display range b can be touch-operated as described above, they have not be discriminated from display objects displayed in the display range a, and a frame border indicating the display range b and a guidance as shown in FIG. 9A are not displayed.

FIG. 9C shows an exemplary screen display on the TFT 12 when the vari-angle display unit 801 is in the position C. In the position C, the display surface of the TFT 12 and the touch panel 13 are away from the eye proximity sensor 14, and thus, the possibility of the eye proximity sensor 14 falsely detecting an approach of the hand trying to touch the touch panel 13 as an approach of the eye can be eliminated. Thus, as in the position B, all of display objects indicating shooting conditions displayed on the TFT 12 are configure to accept touch operations. Namely, touch operations on display objects displayed in the display range b, which cannot be touch-operated in the position A, are also accepted. It should be noted that because in the position B and the position C, the upper and lower parts of the vari-angle display unit 801 are reversed, contents displayed in the upper and lower parts are also reversed. Namely, the positions of the display range a and the display range b described with reference to FIG. 9B are vertically inverted as shown in FIG. 9C.

In the position D, the display surface of the TFT 12 is not viewable, and touch operations cannot be performed on the touch panel 13. Thus, display on (light emission of) the TFT 12 and detection of touches on the TFT 12 are turned off to save power.

FIGS. 10A to 10D are flowcharts of a manual shooting mode process in the camera 40 according to the fourth embodiment described above. These flowcharts are implemented by a CPU in the system control unit 50 executing a method in accordance with a program which is stored in the nonvolatile memory 56 and loaded into the system memory 52.

In the camera 40, when the mode is switched into the manual shooting mode through operation of the mode dial 16 or the like, the system control unit 50 starts the process in FIGS. 10A to 10D. It should be noted that in the flowcharts described below, whenever a shooting operation is performed, this is accepted, and shooting is performed as an interrupt process.

First, in step S1001, the system control unit 50 determines whether or not the vari-angle display unit 801 is in the position A based on an output from the position detection unit. When determining that the vari-angle display unit 801 is in the position A, the system control unit 50 proceeds to step S1002, and when determining that the vari-angle display unit 801 does not take the position A, the system control unit 50 proceeds to step S1021.

In the step S1002, the system control unit 50 turns on (enables) and operates the eye proximity sensor 14. The system control unit 50 also turns on display on the TFT 12 and backlight emission. The system control unit 50 also turns on detection of touches on the touch panel 13, and operates the touch panel 13. It should be noted that detection of touches on the touch panel 13 may be partially turned on so that only touches in the display range a can be detected. For example, when the touch panel 13 is comprised of a plurality of sensors such as a capacitance sensor, a sensor for detecting touches in the display range a may be turned on, and a sensor for detecting touches in the display range b may be turned off to save power.

In the next step S1003, the system control unit 50 causes the TFT 12 to produce a screen display (display A) in the position A described above with reference to FIG. 9A.

In the next step S1004, the system control unit 50 determines whether or not an approach of the eye is detected by the eye proximity sensor 14. In a strict sense, the system control unit 50 determines whether or not any object is approaching the eye proximity sensor 14, not whether or not the eye is approaching the eye proximity sensor 14. When determining that any object is approaching the eye proximity sensor 14, the system control unit 50 proceeds to step S1005, and when determining that any object is not approaching the eye proximity sensor 14, the system control unit 50 proceeds to step S1008.

In the step S1005, the system control unit 50 turns off display on the TFT 12, backlight emission, and detection of touches on the touch panel 13. The reason why display on the TFT 12 and backlight emission are turned off is to prevent them from obstructing the user's view by dazzling the user's eye when the user looks through the viewfinder 18. Alternatively, only backlight emission may be turned off or reduced (light emission luminance is reduced) without turning off display on the TFT 12. The reason why detection of touches on the touch panel 13 is turned off is to prevent an unintended operation from being performed due to the nose touching the touch panel 13 when the user looks through the viewfinder 18. Here, it is assumed that detection of touches on the touch panel 13 is entirely turned off (or touches themselves are touched, but detection results thereof are ignored), detection of touches may be partially turned off (touch operations are rejected) only in an area which the nose may touch.

In the next step S1006, the system control unit 50 determines whether or not an approach of the eye is continuously detected by the eye proximity sensor 14. When determining that an approach of the eye is continuously detected, the system control unit 50 carries out the process in the step S1006 again, and when determining that an approach of the eye is not detected, the system control unit 50 proceeds to step S1007.

In the step S1007, the system control unit 50 turns on display on the TFT 12, backlight emission, and detection of touches on the touch panel 13, and returns the TFT 12 the screen display (display A) produced in the step S1003.

In the next step S1008, the system control unit 50 determines whether or not the dial 803 is operated. When determining that the dial 803 is operated, the system control unit 50 proceeds to step S1009, and when determining that the dial 803 is not operated, the system control unit 50 proceeds to step S1010.

In the step S1009, the system control unit 50 changes aperture value by increasing or decreasing the same according to the operation of the dial 803.

In the next step S1010, the system control unit 50 determines whether or not a touch operation is performed in the display range a. When a touch operation is performed in the display range a, the system control unit 50 proceeds to step S1011, and when a touch operation is not performed in the display range a, the system control unit 50 proceeds to step S1012.

In the step S1011, the system control unit 50 changes various settings including shooting conditions according to a touch operation. For example, the system control unit 50 changes shutter speed according to a touch operation on a display object indicating a shutter speed (Tv value) displayed in the display range a (a display "1/125" in FIG. 9A).

In the next step S1012, based on an output from the position detection unit, the system control unit 50 determines whether or not the position of the vari-angle display unit 801 has changed. When determining that the position of the vari-angle display unit 801 has changed, the system control unit 50 proceeds to the step S1001, and when determining that the position of the vari-angle display unit 801 has not changed, the system control unit 50 proceeds to step S1013.

In the step S1013, the system control unit 50 determines whether or not to terminate the manual shooting mode process. The manual shooting mode process is terminated, for example, when the manual shooting mode is switched to another shooting mode through operation of the mode dial 16 or the like, when the power is turned off, or when the manual shooting mode is switched to the reproduction mode through depression of the replay button 19c. When determining to terminate the manual shooting mode process, the system control unit 50 terminates the manual shooting mode process, and when determining not to terminate the manual shooting mode process, the system control unit 50 returns to the step S1004 and carries out the process again.

As described above, in the steps S1002 to S1013 in the case where the vari-angle display unit 801 is in the position A, touch operations in the display range b are not accepted.

Next, in the step S1021, based on an output from the position detection unit, the system control unit 50 determines whether or not the vari-angle display unit 801 is in the position B. When determining that the vari-angle display unit 801 is in the position B, the system control unit 50 proceeds to step S1022, and when determining that the vari-angle display unit 801 does not take the position B, the system control unit 50 proceeds to step S1041.

In the step S1022, the system control unit 50 turns on (enables) and operates the eye proximity sensor 14. The system control unit 50 also turns on display on the TFT 12 and backlight emission. The system control unit 50 also turns on detection of touches on the touch panel 13, and operates the touch panel 13. Here, detection of touches on the touch panel 13 is turned on so that touch operations in the display range b can also be detected.

In the next step S1023, the system control unit 50 causes the TFT 12 to produce a screen display (display B) in the position B described above with reference to FIG. 9B.

Processes in the subsequent steps S1024 to S1029 are the same as the steps S1004 to S1009, and therefore, description thereof is omitted.

Next, in step S1030, the system control unit 50 determines whether or not a touch operation is performed on a display object displayed on the TFT 12 irrespective of whether the display object is displayed in the display range a or the display range b. When determining that a touch operation is performed on the display object, the system control unit 50 proceeds to step S1031, and when a touch operation is not performed on the display object, the system control unit 50 proceeds to step S1032.

In the step S1031, the system control unit 50 changes various settings including shooting conditions according to a touch operation. For example, the system control unit 50 changes shutter speed according to a touch operation on a display object indicating a shutter speed (Tv value) displayed in the display range a (a display "1/125" in FIG. 9A). The system control unit 50 may change aperture value according to a touch operation on an area where a display object "F8.0" indicating an aperture value displayed in the display range b.

A process in the subsequent step S1032 is the same as the above described steps S1012, and therefore, description thereof is omitted.

Next, in step S1033, the system control unit 50 determines whether or not to terminate the manual shooting mode process. When determining to terminate the manual shooting mode process, the system control unit 50 terminates the manual shooting mode process, and when determining not to terminate the manual shooting mode process, the system control unit 50 returns to the step S1024 and carries out the process again.

As described above, in the steps S1022 to S1033 in the case where the vari-angle display unit 801 is in the position B, touch operations in the display range b as well are accepted.

Next, in the step S1041, based on an output from the position detection unit, the system control unit 50 determines whether or not the vari-angle display unit 801 is in the position C. When determining that the vari-angle display unit 801 is in the position C, the system control unit 50 proceeds to step S1042, and when determining that the vari-angle display unit 801 does not take the position C, the system control unit 50 proceeds to step S1062.

In the step S1042, the system control unit 50 turns on (enables) and operates the eye proximity sensor 14. The system control unit 50 also turns on display on the TFT 12 and backlight emission. The system control unit 50 also turns on detection of touches on the touch panel 13, and operates the touch panel 13. Here, detection of touches on the touch panel 13 is turned on so that touch operations in the display range b can also be detected.

In the next step S1043, the system control unit 50 causes the TFT 12 to produce a screen display (display C) in the position C described above with reference to FIG. 9 C.

Processes in the subsequent steps S1044 to S1049 are the same as the steps S1004 to S1009, and therefore, description thereof is omitted.

Also, processes in the subsequent steps S1050 to S1052 are the same as the steps S1030 to S1032, and therefore, description thereof is omitted.

Next, in step S1053, the system control unit 50 determines whether or not to terminate the manual shooting mode process. When determining to terminate the manual shooting mode process, the system control unit 50 terminates the manual shooting mode process, and when determining not to terminate the manual shooting mode process, the system control unit 50 returns to the step S1044 and carries out the process again.

Then, in the step S1062, the system control unit 50 turns off (disables) the eye proximity sensor 14. The system control unit 50 also turns off display on the TFT 12, backlight emission, and detection of touches on the touch panel 13. Processes in the subsequent steps S1068, S1069, and S1072 are the same as the steps S1008, S1009, and S1012, and therefore, description thereof is omitted.

Next, in step S1073, the system control unit 50 determines whether or not to terminate the manual shooting mode process. When determining to terminate the manual shooting mode process, the system control unit 50 terminates the manual shooting mode process, and when determining not to terminate the manual shooting mode process, the system control unit 50 returns to the step S1068 and carries out the process again.

It should be noted that in the position A, when the second-type display objects indicating a plurality of shooting conditions are displayed in the display range b on which touch operations are not accepted, they may be changed through operation on operating members which are placed at positions other than the touch panel 13 and correspond to the respective display objects.

Moreover, a selection frame may be additionally displayed for any of display objects indicating a plurality of shooting conditions displayed in the display range b on which touch operations are not accepted so that shooting conditions indicated by the display object selected by the selection frame can be changed through operation of the dial 803. The selection frame is moved by, for example, operating the four-way button 19b.

Moreover, for a predetermined time period after the position A is changed to the position B or C, a display object that has not been touch-operable in the position A and becomes touch-operable in the position B or C may be highlighted, a guidance indicating that the display object becomes touch-operable may be newly displayed after the change in position. This enables the user to recognize that touch-operation becomes possible. Examples of the way in which a display object is highlighted include displaying the concerned display object itself or a background in a different color from other display objects, or displaying the concerned object in a blinking manner.

According to the camera 40 as the image pickup apparatus of the fourth embodiment described above, the touch-operable first-type display objects are not placed at positions close to the eye proximity sensor 14 in the display range of the TFT 12 when the vari-angle display unit 801 is in such a position that an approach of a finger performing a touch operation is likely to be falsely detected as an approach of the eye according to the position of the vari-angle display unit 801. This can reduce the likelihood that an approach of a finger performing a touch operation will be falsely detected as an approach of the eye even when the vari-angle display unit 801 is in such a position that an approach of a finger performing a touch operation is likely to be falsely detected as an approach of the eye. Moreover, because the touch-operable first-type display objects can be placed at any positions in the display range of the TFT 12 as long as the vari-angle display unit 801 is in such a position that an approach of a finger performing a touch operation is not likely to be falsely detected as an approach of the eye, operability can be enhanced.

It should be noted that in the above described embodiments, because in the reproduction mode, the eye proximity sensor 14 is turned off (disabled), the possibility of the eye proximity sensor 14 falsely detecting an approach of a finger performing a touch operation as an approach of the eye and turning off the TFT 12 can be eliminated. Thus, in the reproduction mode, the touch-operable first-type display objects are placed irrespective of whether they are displayed in the display range a or the display range b. On this occasion, the touch-operable first-type display objects displayed in the display range b are preferably display objects to which functions unused in the shooting mode are assigned. This can reduce the likelihood that in the shooting mode, a finger will approach the eye proximity sensor 14 in an attempt to touch a display object displayed in the display range b from force of habit in the reproduction mode.

It should be noted that although in the above described embodiments, the eye proximity sensor 14 is disposed slightly to the right in the upper part of the TFT 12 as shown in FIG. 1, the eye proximity sensor may be disposed at another location as long as it can detect an approach of the user's eye trying to looking through the viewfinder. In this case as well, the first-type display objects that perform functions assigned thereto by being touched are farther away from the eye proximity sensor on the display surface of the TFT 12 (the touch panel 13) than the second-type display objects that do not perform functions assigned thereto even when touched.

Moreover, for example, the second-type display objects are made visually different from the first-type display objects in manners explained hereafter. Specifically, the second-type display objects can be displayed at lower color saturation (light-colored) than the first-type display objects. The second-type display objects can be displayed with a different lightness (lighter or darker) from the lightness of the first-type display objects. While the first-type display objects are displayed in chromatic color (in color), the second-type display objects can be displayed in achromatic color (in black and white or gray). The first-type display objects can be displayed to look as if they were protruded from its background, and the second-type display objects can be displayed to look like protruding to a smaller degree than the first-type display objects, or not protruding at all, or the second-type display objects can be displayed to look as if they were concave.

The above described display form enables the user to recognize that the first-type display objects can be touch-operated, but the second-type display objects cannot be touch-operated. A display that indicates prohibition of operation may be superposed on the second-type display objects, or in the vicinity of and in parallel to the second-type display objects.

It should be noted that control of the system control unit 50 may be exercised by a piece of hardware or may be shared by a plurality of hardware.

Moreover, although in the descriptions of the above described embodiments, the present invention is applied to the digital single-lens reflex camera, the present invention is not limited to this, but the present invention may be applied to any image pickup apparatus that has an eyepiece finder (either an optical finder or an EVF finder), and a means for detecting an approach of the eye looking through the viewfinder. Namely, the present invention may be applied to a mirrorless digital single-lens reflex camera, a compact digital camera with a viewfinder, a digital video camera, a camera-equipped PDA, a camera-equipped cellular phone unit, a camera-equipped music player, a camera-equipped game machine, a camera-equipped electronic book reader, or the like.

Moreover, the information display unit is not limited to being the TFT liquid crystal display unit, but rather may instead be an organic EL display, a surface-conduction electron-emitter display (SED), a plasma display, or the like.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-089409 filed Apr. 8, 2010 and No. 2011-080212 filed Mar. 31, 2011, which are hereby incorporated by reference herein in their entirety.

What is claimed is:

1. An image pickup apparatus comprising:
a finder having an eyepiece;
an approach detection unit configured to detect an object approaching the eyepiece;
a touch-panel type display unit;
a control unit configured to, when said approach detection unit detects the object approaching, provide control to reduce a light emission luminance of said display unit or turn off display on said display unit;
a display control unit configured to, in a state in which said approach detection unit has not detected the object approaching, provide control so that first-type display objects that execute assigned functions in response to touch operations are displayed farther from said approach detection unit on a display surface of said display unit than second-type display objects that do not execute assigned functions even when touched;
an execution unit configured to, when a touch on any of the first-type display objects is detected, execute a function assigned to the first-type display object;
a first housing provided with said approach detection unit, and a second housing rotatably mounted on said first housing and having said display unit; and
a position detection unit configured to detect a position of said second housing to said first housing,
wherein based on the position of said second housing detected by said position detection unit, said display control unit provides control to display information, which is displayed as the second-type display objects when said second housing is closed relative to said first housing so as to make the display surface of said display unit viewable, and as the first-type display objects when said second housing is opened relative to said first housing.

2. The image pickup apparatus according to claim 1, further comprising an input control unit configured to, when the object is detected by said approach detection unit, provide control to disable touch operations on said display unit.

3. The image pickup apparatus according to claim 1, further comprising an approach detection switching unit configured to selectively enable or disable said approach detection unit.

4. The image pickup apparatus according to claim 3, wherein in a shooting mode, said approach detection switching unit enables said approach detection unit, and when said approach detection unit has not detected the object approaching, said display control unit causes said display unit to display the first-type display objects and the second-type display objects, and when said approach detection unit has detected the object approaching, said control unit reduces a light emission luminance of said display unit or turns off display on said display unit.

5. The image pickup apparatus according to claim 1, wherein said display control unit provides control to display a display object representing an aperture value in a shutter speed priority mode as the second-type display object.

6. The image pickup apparatus according to claim 1, wherein said display control unit provides control to display a display object representing a shutter speed value in an aperture priority mode as the second-type display object.

7. The image pickup apparatus according to claim 1, wherein said display control unit provides control to display a shutter speed value and an aperture value in a program mode as the second-type display objects.

8. The image pickup apparatus according to claim 1, wherein said display control unit provides control to display the second-type display objects on said display unit in a display form different from a display form in which the first-type display objects are displayed.

9. The image pickup apparatus according to claim 8, wherein said display control unit provides control to display the second-type display objects on said display unit in color saturation, a brightness, and a color at least one of which is different from color saturation, a brightness, and a color in which the first-type display objects are displayed.

10. The image pickup apparatus according to claim 8, wherein said display control unit provides control to display the second-type display objects in a negative-positive reversed form relative to the first-type display objects.

11. The image pickup apparatus according to claim 8, wherein said display control unit causes the first-type display objects to look as if the first-type display objects were protruded from a background of the first-type display objects, and causes the second-type display objects to look like protruding to a smaller degree than the first-type display objects, or not protruding at all, or look as if they were concave.

12. The image pickup apparatus according to claim 8, wherein said display control unit provides control to display a guidance indicating an impossibility to perform touch operations in a display range where the second-type display objects are displayed on said display unit.

13. The image pickup apparatus according to claim 1, further comprising a touch detection control unit configured to provide control so as not to detect touch operations in a display range where the second-type display objects are displayed on the display surface of said display unit.

14. The image pickup apparatus according to claim 1, wherein the first-type display objects and the second-type display objects are display objects representing shooting conditions set for the image pickup apparatus.

15. The image pickup apparatus according to claim 14, further comprising an operation member different from said touch-panel type display unit, and configured to receive operations of changing setting values of the shooting conditions represented by the second-type display objects.

16. A control method for an image pickup apparatus which comprises a finder having an eyepiece, an approach detection unit configured to detect an object approaching the eyepiece, a touch-panel type display unit, a first housing provided with said approach detection unit, and a second housing rotatably mounted on said first housing and having said display unit, said method comprising:
 a control step of, when the approach detection unit detects the object approaching, providing control to reduce a light emission luminance of the display unit or turn off display on said display unit;
 a display control step of, in a state in which the approach detection unit has not detected the object approaching, providing control so that display objects of a first type that execute assigned functions in response to touch operations are displayed farther from the approach detection unit on a display surface of the display unit than display objects of a second type that do not execute assigned functions even when touched;
 an execution step of, when a touch on any of the first-type display objects is detected, executing a function assigned to the first-type display object; and
 a position detection step of detecting a position of said second housing to said first housing;
 wherein based on the position of said second housing detected by said position detection step, said display control step provides control to display information, which is displayed as the second-type display objects when said second housing is closed relative to said first housing so as to make the display surface of said display unit viewable, and as the first-type display objects when said second housing is opened relative to said first housing.

17. A computer-readable non-transitory storage medium storing a program for causing an image pickup apparatus to execute a control method for the image pickup apparatus according to claim 16.

18. An image pickup apparatus comprising:
 a finder having an eyepiece;
 an approach detection unit configured to detect an object approaching the eyepiece;
 a touch-panel type display unit;
 a control unit configured to, when said approach detection unit detects the object approaching, provide control to reduce a light emission luminance of said display unit or turn off display on said display unit;
 a display control unit configured to, in a state in which said approach detection unit has not detected the object approaching, provide control so that first-type display objects that execute assigned functions in response to touch operations are displayed farther from said approach detection unit on a display surface of said display unit than a specific display object;
 an execution unit configured to, when a touch on any of the first-type display objects is detected, execute a function assigned to the first-type display object;
 a first housing provided with said approach detection unit, and a second housing rotatably mounted on said first housing and provided with said display unit; and
 a position detection unit configured to detect a position of said second housing to said first housing,
 wherein based on the position of said second housing detected by said position detection unit, said execution unit does not execute functions assigned to the specific display object even when touch operations are performed on the specific display object when said second housing is closed relative to said first housing so as to make the display surface of said display unit viewable, and on the other hand, when said second housing is opened relative to said first housing, executes functions assigned to the specific display object in response to touch operations on the specific display object.

19. A control method for an image pickup apparatus which comprises a finder having an eyepiece, an approach detection unit configured to detect an object approaching the eyepiece; a touch-panel type display unit; a first housing provided with said approach detection unit, and a second housing rotatably mounted on said first housing and provided with said display unit, said method comprising:
 a control step of, when said approach detection unit detects the object approaching, providing control to reduce a light emission luminance of said display unit or turn off display on said display unit;
 a display control step of, in a state in which said approach detection unit has not detected the object approaching, providing control so that first-type display objects that execute assigned functions in response to touch operations are displayed farther from said approach detection unit on a display surface of said display unit than a specific display object;

an execution step of, when a touch on any of the first-type display objects is detected, executing a function assigned to the first-type display object; and a position detection step of detecting a position of said second housing to said first housing, wherein based on the position of said second housing detected by said position detection step, said execution step does not execute functions assigned to the specific display object even when touch operations are performed on the specific display object when said second housing is closed relative to said first housing so as to make the display surface of said display unit viewable, and on the other hand, when said second housing is opened relative to said first housing, executes functions assigned to the specific display object in response to touch operations on the specific display object.

20. A computer-readable non-transitory storage medium storing a program for causing an image pickup apparatus to execute a control method for the image pickup apparatus according to claim 19.

* * * * *